US012649478B2

(12) United States Patent
Hari et al.

(10) Patent No.: US 12,649,478 B2
(45) Date of Patent: Jun. 9, 2026

(54) METHOD TO ESTIMATE PROCESSING RATE REQUIREMENT FOR SAFE AV DRIVING TO PRIORITIZE RESOURCE USAGE

(71) Applicant: Nvidia Corporation, Santa Clara, CA (US)

(72) Inventors: Siva Kumar Sastay Hari, Sunnyvale, CA (US); Yu-Shun Hsiao, Cambridge, MA (US); Timothy Tsai, Santa Clara, CA (US); Vasu Singh, Munich (DE)

(73) Assignee: Nvidia Corporation, Santa Clara, CA (US)

( * ) Notice: Subject to any disclaimer, the term of this patent is extended or adjusted under 35 U.S.C. 154(b) by 483 days.

(21) Appl. No.: 17/963,531

(22) Filed: Oct. 11, 2022

(65) Prior Publication Data

US 2023/0112004 A1     Apr. 13, 2023

Related U.S. Application Data

(60) Provisional application No. 63/254,390, filed on Oct. 11, 2021.

(51) Int. Cl.
 B60W 50/06 (2006.01)
 B60W 50/02 (2012.01)
 (Continued)

(52) U.S. Cl.
 CPC ........ B60W 50/06 (2013.01); B60W 50/0205 (2013.01); B60W 50/035 (2013.01); (Continued)

(58) Field of Classification Search
 None
 See application file for complete search history.

(56) References Cited

U.S. PATENT DOCUMENTS

| | | | |
|---|---|---|---|
| 2010/0238836 A1* | 9/2010 | Diab | H04W 40/02 |
| | | | 370/254 |
| 2016/0058287 A1* | 3/2016 | Dyell | A61B 5/746 |
| | | | 340/870.07 |

(Continued)

OTHER PUBLICATIONS

Steven L. Chodos, "Tracking loop bandwidth, sensor sample frequency, and track loop delays", pub. 1998, Part of the SPIE Conference on Acquisition Tracking, and Pointing XII • Orlando, Florida • Apr. 1998, (Year: 1998).*

*Primary Examiner* — Mekonen T Bekele
(74) *Attorney, Agent, or Firm* — Hogan Lovells US LLP

(57) ABSTRACT

An estimation model utilizes simulations of an autonomous vehicle and objects detected near the automated vehicle to develop estimates of tolerable frame processing latency to develop real world frame processing latency estimates for similar driving conditions. An estimation model can a minimum tolerable latency for processing the frames of image data of an object detection camera on an autonomous vehicle using the object state data of the objects detected near the autonomous vehicle. An autonomous vehicle system process can determine if the processing latency of a sensor is greater than the modeled tolerable latency for that sensor, then a safety check is failed and an alert is sent. An autonomous vehicle system process can determine if the processing latency of a sensor is greater than the modeled tolerable latency for that sensor, then the hardware resources are prioritized to the processing for that sensor. An autonomous vehicle system process can determine if the processing latency of a sensor is greater than the modeled tolerable latency for that sensor, hardware performance may be increased.

18 Claims, 23 Drawing Sheets

(51) Int. Cl.
B60W 50/035 (2012.01)
B60W 50/14 (2020.01)
B60W 60/00 (2020.01)

(52) U.S. Cl.
CPC ........ B60W 50/14 (2013.01); B60W 60/0015 (2020.02); *B60W 2050/143* (2013.01)

(56) References Cited

U.S. PATENT DOCUMENTS

2019/0061712 A1 * 2/2019 Melik-Barkhudarov ....................
                                                    B60T 8/172
2019/0354111 A1 * 11/2019 Cheng ................. G05D 1/0011

* cited by examiner

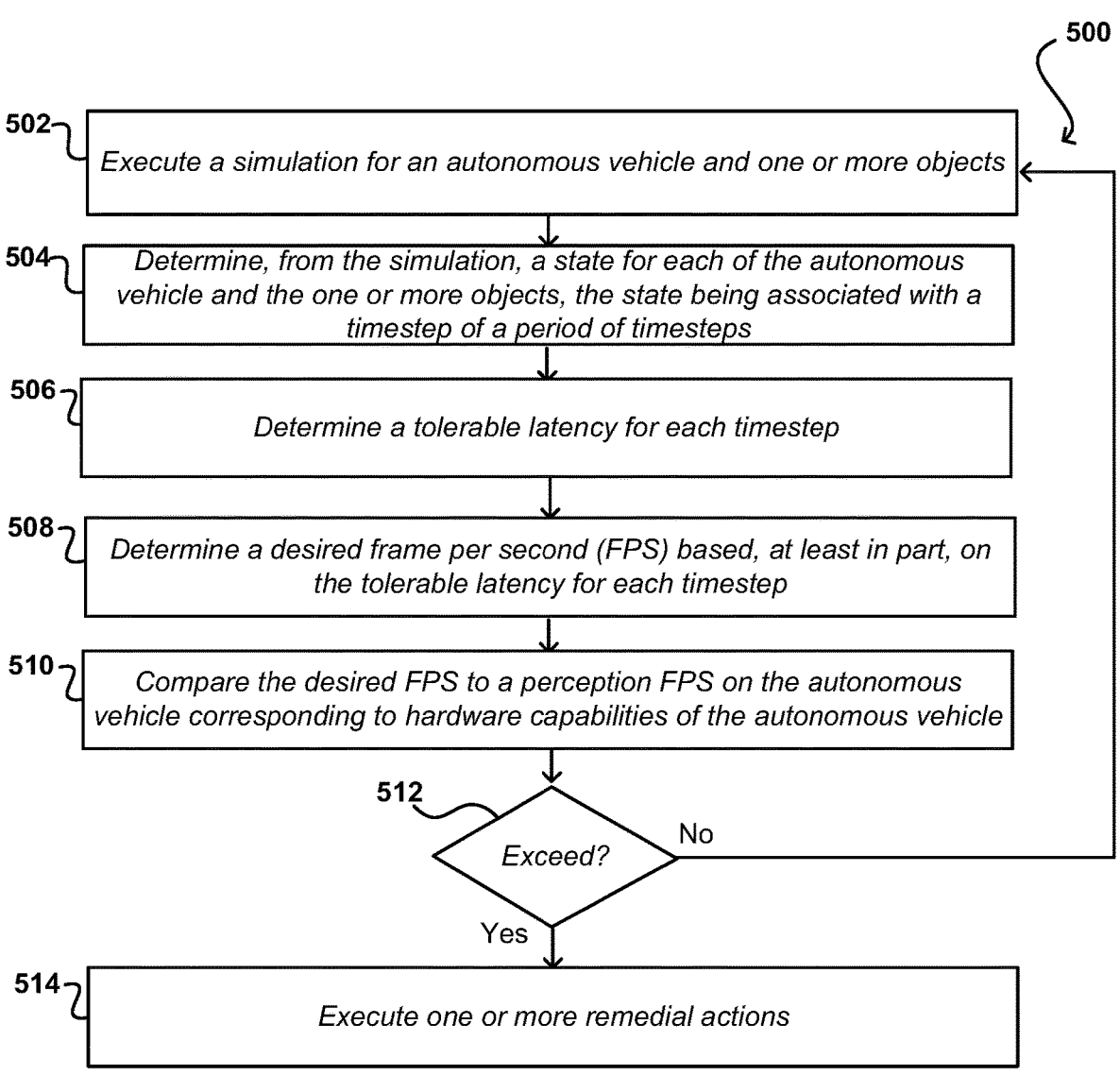

502 — Execute a simulation for an autonomous vehicle and one or more objects

504 — Determine, from the simulation, a state for each of the autonomous vehicle and the one or more objects, the state being associated with a timestep of a period of timesteps 506 — Determine a tolerable latency for each timestep 508 — Determine a desired frame per second (FPS) based, at least in part, on the tolerable latency for each timestep 510 — Compare the desired FPS to a perception FPS on the autonomous vehicle corresponding to hardware capabilities of the autonomous vehicle 512 — Exceed?

No

Yes

514 — Execute one or more remedial actions

*Determine, based at least in part on a predicted scenario trace, a tolerable latency* — 522

*Determine a current sensor latency is greater than the tolerable latency* — 524

526

Work Prioritization          *Action?*          Alarm

528

*Execute at least one of a pre-processing rate drop or a processing rate drop protocol* — 530

*Provide an alarm*

*Determine an updated sensor latency* — 532

534

*Resolved?*          No

Yes

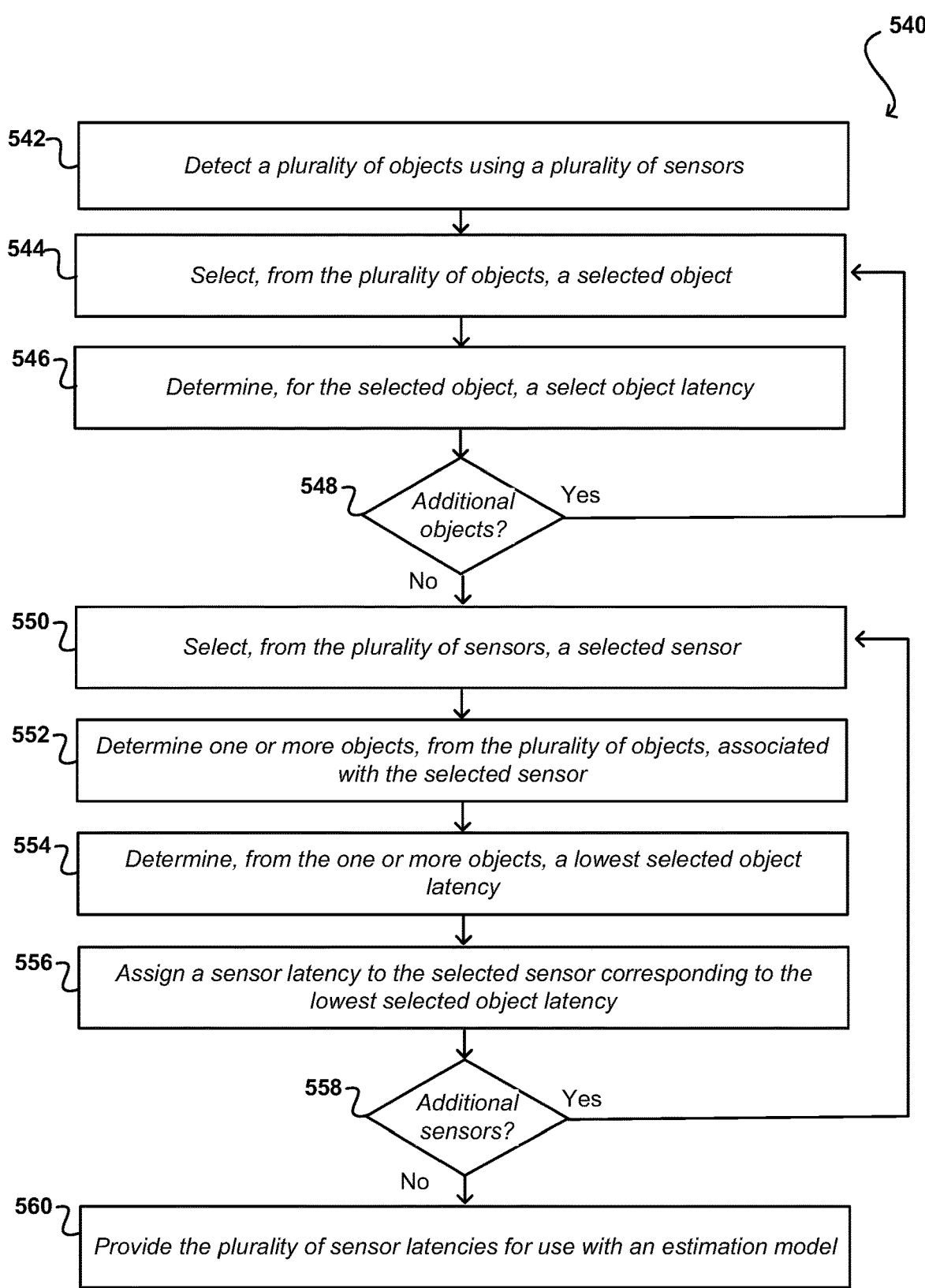

540

542 — Detect a plurality of objects using a plurality of sensors

544 — Select, from the plurality of objects, a selected object

546 — Determine, for the selected object, a select object latency

548 — Additional objects? — Yes

No

550 — Select, from the plurality of sensors, a selected sensor

552 — Determine one or more objects, from the plurality of objects, associated with the selected sensor 554 — Determine, from the one or more objects, a lowest selected object latency 556 — Assign a sensor latency to the selected sensor corresponding to the lowest selected object latency 558 — Additional sensors? — Yes No 560 — Provide the plurality of sensor latencies for use with an estimation model

FIG. 5C

DATA CENTER
800

1300

DEPLOYMENT SYSTEM 1306

1318

SOFTWARE

1320

SERVICES

1322

HARDWARE

OUTPUT MODEL 1316

MODEL TRAINING 1314

MODEL REGISTRY 1324

TRAINING SYSTEM 1304

LABELED DATA 1312

AI-ASSISTED ANNOTATION 1310

IMAGING DATA 1308

1302

METHOD TO ESTIMATE PROCESSING RATE REQUIREMENT FOR SAFE AV DRIVING TO PRIORITIZE RESOURCE USAGE

CROSS-REFERENCE TO RELATED APPLICATIONS

This application claims priority to and the benefit of U.S. Provisional Patent Application No. 63/254,390, filed Oct. 11, 2021, titled "A METHOD TO ESTIMATE PROCESS-ING RATE REQUIREMENT FOR SAFE AV DRIVING TO PRIORITIZE RESOURCE USAGE," the full disclosure of which is hereby incorporated by reference in its entirety for all purposes.

BACKGROUND

As autonomous vehicles move toward increased com-plexity, there is a corresponding need to improve the safety of the operations performed by the autonomous vehicles. This can include improving the ability of the autonomous vehicle hardware to process data from equipment used to navigate the vehicle, including environmental sensors and cameras. For many autonomous vehicles, processing all of the information from this equipment with high accuracy and quickly for real-time driving requires substantial resources. In order to ensure that enough resources are available and that safe traveling conditions are maintained, improvements to the autonomous vehicle hardware resources and optimi-zations to neural networks are made. Such an approach can provide for safe operation and bolster data processing in most instances, but as the amount of total work required for safe driving increases these benefits can become neutralized, providing a less than desirable operational experience.

BRIEF DESCRIPTION OF THE DRAWINGS

Various embodiments in accordance with the present disclosure will be described with reference to the drawings, in which:

FIG. 5A illustrates a flow chart of an example of a process to determine a tolerable latency, according to at least one embodiment;

FIG. 5C illustrates a flow chart of an example of a process to determine a sensor latency, according to at least one embodiment;

DETAILED DESCRIPTION

Approaches in accordance with various embodiments can provide for the improved hardware resource application and efficient object detection camera image processing for auto-mated, or semi-automated, devices, such as vehicles or robots. In particular, various embodiments use simulations of autonomous vehicles and objects located near the auto-mated vehicle to develop estimates of tolerable frame pro-cessing latency to develop real world frame processing latency estimates for similar driving conditions. For an autonomous (or semi-autonomous) vehicle or robot, a real time frame processing estimation model may be used to determine the tolerable latency for each object detection camera or sensor. In at least one embodiment, if the pro-cessing latency of a sensor is greater than the tolerable latency for that sensor, then a safety check is failed and an alert is sent. In at least another embodiment, if the process-ing latency of a sensor is greater than the tolerable latency for that sensor, then the hardware resources are prioritized to the processing for that sensor. In at least another embodi-ment, if the processing latency of a sensor is greater than the tolerable latency for that sensor, hardware performance may be increased.

Figure 1A:
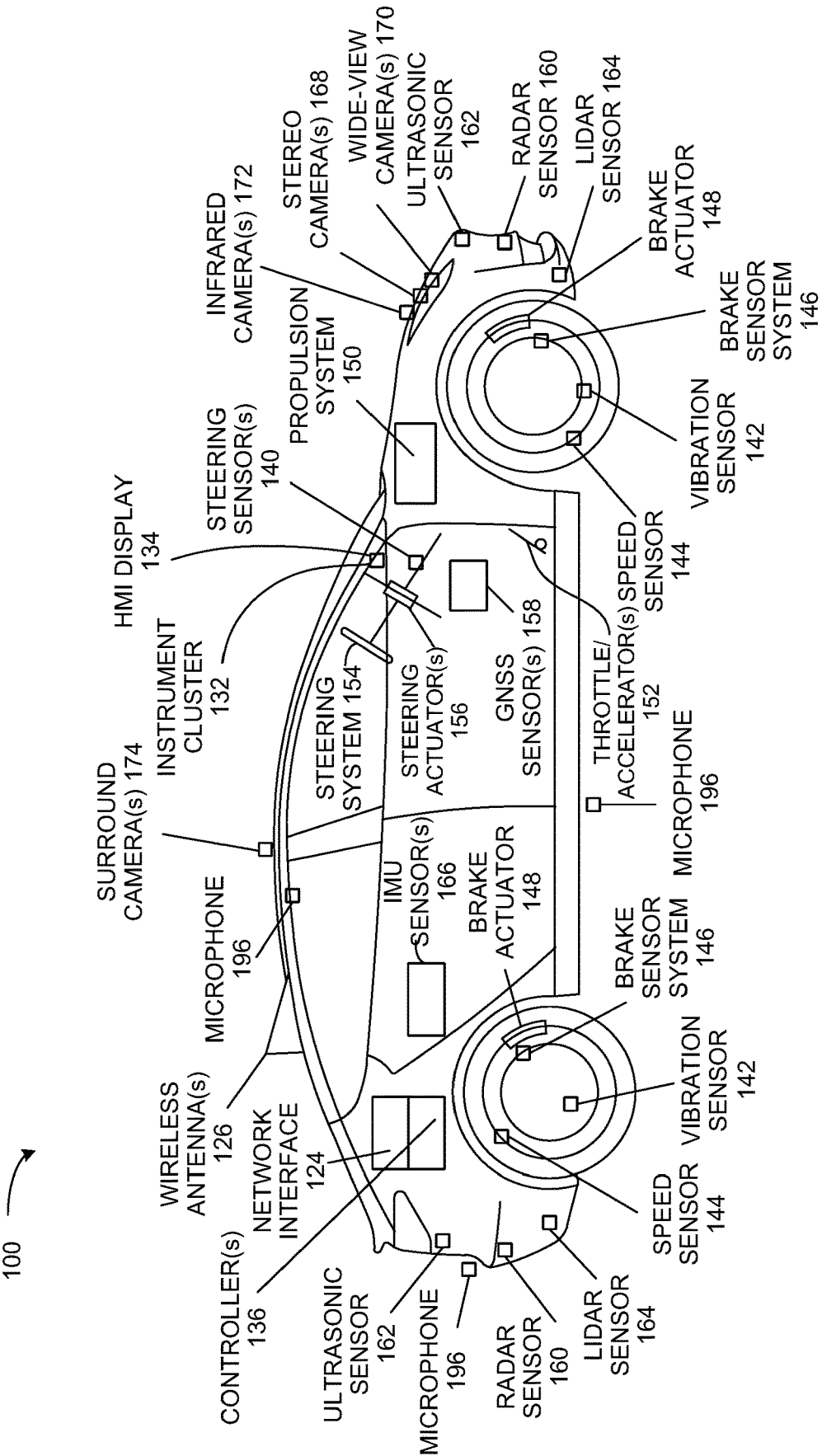
FIGS. 1A and 1B illustrate examples of components of an autonomous vehicle, according to at least one embodiment.

Consider an autonomous vehicle 100 illustrated in FIG. 1A. In at least one embodiment, vehicle 100 may be, without limitation, a passenger vehicle, such as a car, a truck, a bus, and/or another type of vehicle that accommodates one or more passengers. In at least one embodiment, vehicle 100 may be a semi-tractor-trailer truck used for hauling cargo. In at least one embodiment, vehicle 100 may be an airplane, robotic vehicle, or other kind of vehicle, that may or may not be intended to carry passengers or cargo, but may be intended to perform one or more tasks that require at least some amount of motion or movement of the vehicle.

Autonomous vehicles may be described in terms of auto-mation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 100 may be capable of functionality in accordance with one or more of level 1-level 5 of autonomous driving levels. For example, in at least one embodiment, vehicle 100 may be capable of conditional automation (Level 3), high automation (Level 4), and/or full automation (Level 5), depending on embodiment.

In at least one embodiment, vehicle 100 may include, without limitation, components such as a chassis, a vehicle body, wheels (e.g., 2, 4, 6, 8, 18, etc.), tires, axles, and other components of a vehicle. In at least one embodiment, vehicle 100 may include, without limitation, a propulsion system 150, such as an internal combustion engine, hybrid electric power plant, an all-electric engine, and/or another propulsion system type. In at least one embodiment, propulsion system 150 may be connected to a drive train of vehicle 100, which may include, without limitation, a transmission, to enable propulsion of vehicle 100. In at least one embodiment, propulsion system 150 may be controlled in response to receiving signals from a throttle/accelerator(s) 152.

In at least one embodiment, a steering system 154, which may include, without limitation, a steering wheel, is used to steer a vehicle 100 (e.g., along a desired path or route) when a propulsion system 150 is operating (e.g., when vehicle is in motion). In at least one embodiment, a steering system 154 may receive signals from steering actuator(s) 156. A steering wheel may be optional for full automation (Level 5) functionality. In at least one embodiment, a brake sensor system 146 may be used to operate vehicle brakes in response to receiving signals from brake actuator(s) 148 and/or brake sensors.

In at least one embodiment, controller(s) 136, which may include, without limitation, one or more system on chips ("SoCs") (not shown in FIG. 1A) and/or graphics processing unit(s) ("GPU(s)"), provide signals (e.g., representative of commands) to one or more components and/or systems of vehicle 100. For instance, in at least one embodiment, controller(s) 136 may send signals to operate vehicle brakes via brake actuator(s) 148, to operate steering system 154 via steering actuator(s) 156, and/or to operate propulsion system 150 via throttle/accelerator(s) 152. Controller(s) 136 may include one or more onboard (e.g., integrated) computing devices (e.g., supercomputers) that process sensor signals, and output operation commands (e.g., signals representing commands) to enable autonomous driving and/or to assist a human driver in driving vehicle 100. In at least one embodiment, controller(s) 136 may include a first controller 136 for autonomous driving functions, a second controller 136 for functional safety functions, a third controller 136 for artificial intelligence functionality (e.g., computer vision), a fourth controller 136 for infotainment functionality, a fifth controller 136 for redundancy in emergency conditions, and/or other controllers. In at least one embodiment, a single controller 136 may handle two or more of above functionalities, two or more controllers 136 may handle a single functionality, and/or any combination thereof.

In at least one embodiment, controller(s) 136 provide signals for controlling one or more components and/or systems of vehicle 100 in response to sensor data received from one or more sensors (e.g., sensor inputs). In at least one embodiment, sensor data may be received from, for example and without limitation, global navigation satellite systems ("GNSS") sensor(s) 158 (e.g., Global Positioning System sensor(s)), RADAR sensor(s) 160, ultrasonic sensor(s) 162, LIDAR sensor(s) 164, inertial measurement unit ("IMU") sensor(s) 166 (e.g., accelerometer(s), gyroscope(s), magnetic compass(es), magnetometer(s), etc.), microphone(s) 196, stereo camera(s) 168, wide-view camera(s) 170 (e.g., fisheye cameras), infrared camera(s) 172, surround camera(s) 174 (e.g., 360 degree cameras), long-range cameras (not shown in FIG. 1A), mid-range camera(s) (not shown in FIG. 1A), speed sensor(s) 144 (e.g., for measuring speed of vehicle 100), vibration sensor(s) 142, steering sensor(s) 140, brake sensor(s) (e.g., as part of brake sensor system 146), and/or other sensor types. Sensor data may also include vehicle to vehicle (V2V) and vehicle to everything (V2X) communications.

In at least one embodiment, one or more of controller(s) 136 may receive inputs (e.g., represented by input data) from an instrument cluster 132 of vehicle 100 and provide outputs (e.g., represented by output data, display data, etc.) via a human-machine interface ("HMI") display 134, an audible annunciator, a loudspeaker, and/or via other components of vehicle 100. In at least one embodiment, outputs may include information such as vehicle velocity, speed, time, map data (e.g., a High Definition map (not shown in FIG. 1A), location data (e.g., vehicle 100's location, such as on a map), direction, location of other vehicles (e.g., an occupancy grid), information about objects and status of objects as perceived by controller(s) 136, V2V information, V2X information, etc. For example, in at least one embodiment, HMI display 134 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 100 further includes a network interface 124 which may use wireless antenna(s) 126 and/or modem(s) to communicate over one or more networks. For example, in at least one embodiment, network interface 124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 126 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 1B:
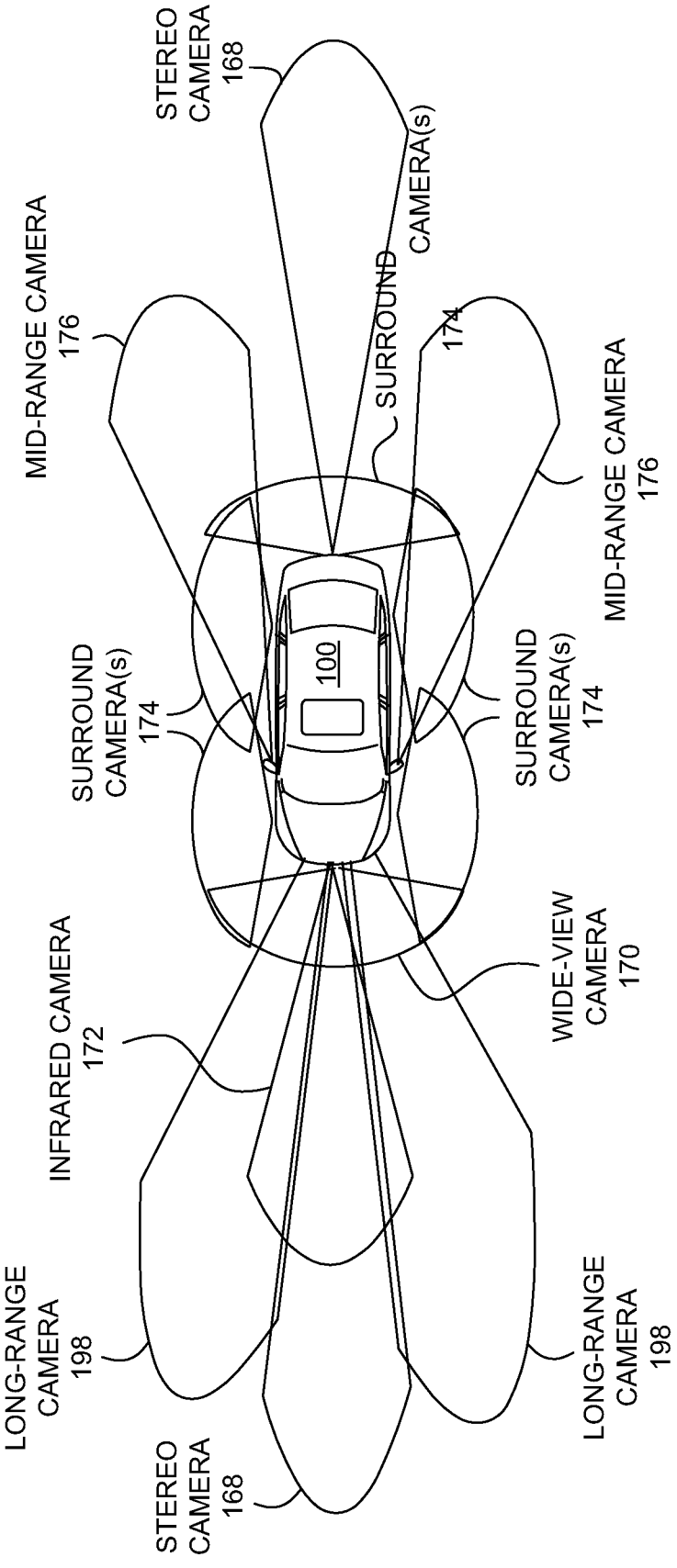

FIG. 1B illustrates an example of camera locations and fields of view for autonomous vehicle 100 of FIG. 1A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 100.

In at least one embodiment, camera types for cameras may include, but are not limited to, digital cameras that may be adapted for use with components and/or systems of vehicle 100. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner in at least one embodiment.

In at least one embodiment, cameras with a field of view that include portions of environment in front of vehicle 100 (e.g., front-facing cameras) may be used for surround view, to help identify forward facing paths and obstacles, as well as aid in, with help of one or more of controllers 136 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 170 may be used to perceive objects coming into view from periphery (e.g., pedestrians, crossing traffic or bicycles). Although only one wide-view camera 170 is illustrated in FIG. 1B, in other embodiments, there may be any number (including zero) of wide-view camera(s) 170 on vehicle 100. In at least one embodiment, any number of long-range camera(s) 198 (e.g., a long-view stereo camera pair) may be used for depth-based object detection, especially for objects for which a neural network has not yet been trained. In at least one embodiment, long-range camera(s) 198 may also be used for object detection and classification, as well as basic object tracking.

In at least one embodiment, any number of stereo camera(s) 168 may also be included in a front-facing configuration. In at least one embodiment, one or more of stereo camera(s) 168 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 100, including a distance estimate for all points in image. In at least one embodiment, one or more of stereo camera(s) 168 may include, without limitation, compact stereo vision sensor(s) that may include, without limitation, two camera lenses (one each on left and right) and an image processing chip that may measure distance from vehicle 100 to target object and use generated information (e.g., metadata) to activate autonomous emergency braking and lane departure warning functions. In at least one embodiment, other types of stereo camera(s) 168 may be used in addition to, or alternatively from, those described herein.

In at least one embodiment, cameras with a field of view that include portions of environment to side of vehicle 100 (e.g., side-view cameras) may be used for surround view, providing information used to create and update occupancy grid, as well as to generate side impact collision warnings. For example, in at least one embodiment, surround camera(s) 174 (e.g., four surround cameras 174 as illustrated in FIG. 1B) could be positioned on vehicle 100. In at least one embodiment, surround camera(s) 174 may include, without limitation, any number and combination of wide-view camera(s) 170, fisheye camera(s), 360 degree camera(s), and/or like. For instance, in at least one embodiment, four fisheye cameras may be positioned on front, rear, and sides of vehicle 100. In at least one embodiment, vehicle 100 may use three surround camera(s) 174 (e.g., left, right, and rear), and may leverage one or more other camera(s) (e.g., a forward-facing camera) as a fourth surround-view camera.

In at least one embodiment, cameras with a field of view that include portions of environment to rear of vehicle 100 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 198 and/or mid-range camera(s) 176, stereo camera(s) 168), infrared camera(s) 172, etc.), as described herein.

In order for such a vehicle to perform a task such as navigation to a destination, a control system can determine one or more actions to take at any given time that correspond to that task. For an autonomous vehicle, this may include making one or more adjustments, such as to a steering or braking system, to cause the vehicle to maneuver in a determined way along a determined path, such as a path that causes the vehicle to navigate down a current lane of a road, within the lane markers, while avoiding collisions and operating at an appropriate speed. In order to determine appropriate actions to take, it can be beneficial in at least some systems to first determine the path or trajectory which the vehicle is to follow. Determining a navigation path can include steps of determining information about an environment which the vehicle is currently operating, such as a high definition (HD) map, model, or representation of the road and nearby objects, which may be obtained from a source having previously modeled that environment, or may be generated in real time using sensors or other mechanisms for perceiving information about the environment. It can also be beneficial in at least some embodiments to determine relevant localization data, or data that indicates where in that environment the vehicle is located, with sufficient accuracy to meet any safety or operational requirements.

As mentioned, however, in order to provide a pleasurable experience for passengers, it can be desirable to determine a path or series of operations that will be at least somewhat optimized for smoothness or comfort in addition to safety. In many instances, this involves a balance between safety and smooth operation, as it is very important to drive safely, but within the range of safe operations it can be desirable to determine a path that provides the most pleasant or consistent ride, such as one without rapid adjustments in direction, acceleration, or deceleration.

Further complicating the matter for at least some types of automation is the fact that operation of automated or semi-automated devices or systems, such as autonomous vehicles, are often subject to very specific or stringent safety requirements or regulations. While it may be desirable to combine data from various sources to determine an optimal path, it may be difficult to prove that such determinations satisfy those requirements or regulations. Further, information from various sources is often kept separate for safety reasons, such that failure of a given sensor or subsystem does not impact the entire operation of the vehicle, such as might result in a sub-optimal path determination. Thus, from a safety standpoint it may be desirable to keep information from different sensors, subsystems, or sources in separate, parallel, or redundant data streams. From an optimal operation standpoint, however, it may be preferable to combine as much information as is available in order to make the best possible decision at any given time.

As an example, an autonomous vehicle might utilize an Automated Driving System (ADS) that perform complicated dynamic driving tasks (DDT). For example, Society of Automotive Engineers (SAE) automation levels 3-5 currently require crash avoidance capabilities, such that human drivers are not required to take over the task of driving task during a failure event. Analysis of hazardous events and their risks can be performed using hazard analysis and risk assessment (HARA) according to the ISO 26262 standard. One of the main functionalities of an example ADS system, which is strongly tied to the safe operation of the ADS system, involves path detection. A path detection module can identify drivable paths, and can provide information regarding road geometry and topology. This may include, for example, data for the center path and/or boundaries of road lanes, as may be determined using data from sources such as images or video captured by cameras on the vehicle, LIDAR data, GPS data, IMU data, or HD map data obtained from a reliable source. Failure in a path detection module can result in hazardous events, such as departing the roadway or entering the path of oncoming traffic. HARA (hazard analysis and risk assessment) analysis suggests that such hazardous events can be fatal, such that there is a need to protect against these hazardous events at, for example, the highest Automotive Safety Integrity Level (ASIL) of ASIL D. In order to ensure that a system can protect against these and other such hazardous events with sufficiently high integrity level, any system, service, or process including or relying upon any of the functional components mentioned above needs to be verified and validated with stringent ASIL D compliance, which can require significant development effort and cost.

Accordingly, approaches in accordance with various embodiments can attempt to concurrently optimize for both safety and performance, while ensuring safety compliance of any produced result. In at least one embodiment, a path detection module of an ADS can provide for safety compliance, such as ASIL D compliance, which can significantly reduce the amount of effort needed for development, verification, and validation effort, while at the same time providing for improved flexibility and robustness in design. Such a system can provide for a fusion of path detection sources, as well as safety (e.g., ASIL D) monitoring of a fused path produced by the system. Such a system can provide for runtime switching between different combinations of localizations and live path perceptions, while providing for high availability. Such a system can also provide for a propagated fusion of fused localization and fused path based at least in part upon a process such as dead reckoning. If a vehicle is unable to detect lane markers at a present time, but those markers have been detected previously and information for those markers is stored, then the vehicle can use information about its speed and heading, for example, along with that historical data to infer perception data for at least a period of time, such as a few seconds depending upon factors such as speed and environment.

Figure 2:
FIG. 2 illustrates an example offline timestep analysis chart that can be utilized, according to at least one embodi-ment.
Figure 2:
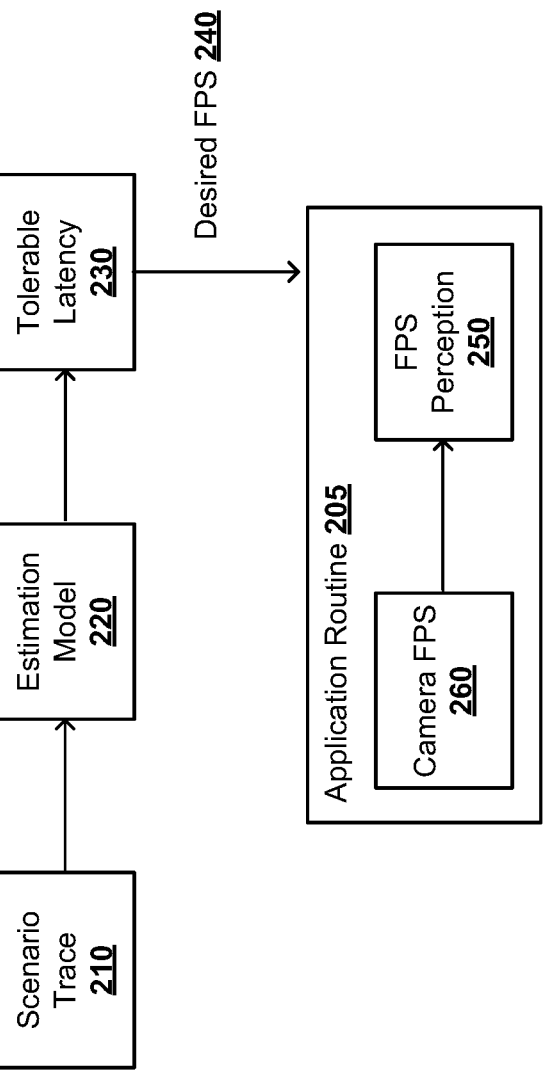

Referring to FIG. 2 Autonomous vehicle system hardware resources process data from multiple sensors in order to provide a safe and efficient experience for passengers. In at least one embodiment, safe operations may refer to no collision occurring between the sensing vehicle (e.g., the AV) and the surrounding actors. The amount of work the hardware can complete is often measured in TOPS (trillions of/tera operations per second). In at least one embodiment, TOPS represents the theoretical max or peak performance of a processor, and that the max achievable performance also depends on other components such as the memory subsystem, network, and/or the like. Autonomous vehicles require enough sensors coverage around the vehicle to allow for sufficient perception of its surroundings. Autonomous vehicles are expected to employ even more sensors and other equipment as the vehicles advance, including twelve or more cameras, six or more radars, and at least one LIDAR sensor. There will be significant processing work to be completed on the hardware deployed on the autonomous vehicle system. In certain instances, the amount of work by the hardware to process the information from the sensors, cameras, and other equipment that will be needed may exceed what the hardware can provide, leading to increased latency of the hardware output. In some situations, where the workload for the processing hardware is high, some of the processes can miss their deadlines for completing their operations, taking longer than expected based on latency or throughput. Even some current autonomous vehicles may encounter situations and periods of time where the software work demand to navigate the vehicle safely may exceed what the performance of the hardware offers. It is contemplated that while much of the discussion here refers to autonomous vehicles, everything disclosed can also apply to any automated or semi-automated system, device, or process.

Even if the problem of excessive demand on the autonomous vehicle hardware is resolved, there may still be cases and periods of time where intermittent processing latency of the information sent from cameras and other sensing equipment may be high. For example, for some autonomous vehicle software algorithms that are dependent on objects sensed by cameras, as the work increases based on the number of objects that are detected, the latency of the hardware may increase. Therefore, if there are many other vehicles located around an autonomous vehicle, the inability of the hardware to handle the object detection processing in a satisfactory amount of time may be a safety concern. Based on this, two problems exist that have not been addressed sufficiently by previous methods. First, the hardware can be under provisioned. Second, during certain situations the processing work takes longer than the available deadlines. These problems can be solved by implementing a work prioritization method that requires after a determined time, the work can either be left undone or the processes can be configured to help prioritize work from a safety and comfort standpoint. This can be done by quantifying the minimum camera frame processing rate requirement to ensure safety and then allocate the extra hardware resources to enhance comfort without compromising safety.

Latency describes how long it takes for a piece of work to be completed. The frame processing rate, mentioned above, is equivalent to the inverse of, or is reciprocal to, the processing latency. The frame processing rate of the autonomous vehicle hardware provides an effective FPS (frames per second) for the feeds from the cameras, which can be different from the actual FPS of the cameras. A system with high latency will result in low processing rates and therefore a low effective FPS. Conversely, a system with low latency will result in a high processing rate, and therefore a high effective FPS. Latency may be described with respect to instantaneous or differential FPS, which may change based on current conditions. A large amount of autonomous vehicle hardware resources are utilized to process images of objects detected by the vehicle cameras. Accordingly, the frame processing rate of camera feed images by hardware resources is suitable for intelligent management in order to allocate a large portion of resources efficiently.

In order to prioritize the work of the autonomous vehicle hardware efficiently while also maintaining safety and comfort, it is beneficial to both determine which camera frames to process first and the rate at which the frames should be processed. To determine an estimate of an acceptable processing rate for use in real world driving conditions, a multi-camera simulation can be utilized. The simulation allows for the analysis of the frame processing rate effectiveness over multiple driving scenarios. Then, it is possible to collect the trace, or the state of all the objects or actors around the autonomous vehicle at each given time, and determine an understanding of where all the actors are in the scenarios and running at determined frame rate for every camera. Based on the known information of where every object is in relation to the autonomous vehicle, an estimate of the minimum frame rate that the autonomous vehicle hardware will tolerate during the scenario can be determined. Understanding that the locations of the objects are known in these scenarios in simulated studies, calculations are performed based on kinematics using the location another vehicle is going to be in future and how long it takes for the autonomous vehicle to reach that future location. If the autonomous vehicle reaches the location before the other vehicle, then there is a potential for collision. To allow the autonomous vehicle to avoid this collision, the frame processing rate should be increased so the other object is monitored at a higher speed. This information regarding the needed frame processing rate provides an estimated prediction of the frame processing rate the hardware should be operating at for each camera of the vehicle during real world operation. Therefore, in real world operation, the frame processing rate can be adjusted to approximately the estimated frame processing rate whenever work prioritization is required.

Embodiments of the present disclosure may include a two-part analysis, where different components within a given part may be reused or otherwise incorporated with the other part. The two-part analysis may not necessarily be performed sequentially or with the same objects/situation, but may be utilized for different situations, such as an offline part and an online part. The offline part may refer to a scenario for processing rate estimation. For example, the offline part may quantify a needed FPS (or effective FPS) in a multi-camera setting to ensure safety. In the offline scenario, one or more simulated paths or trajectories may be calculated, and as a result, ground-truth position information may be known, which may be used to determine the needed frame processing rate. In at least one embodiment, the offline part may be used for improvements or development, such as to verify a system's resource allocation is sufficient for safety or provide an input to design an improved system (e.g., evaluator). Various embodiments may also include a second part, or online part, which is used for estimations for work prioritization, among other uses. For the offline system, the ground truth may not be known due to the use of predicted position information based on sensor information. As a result, this predicted position information may, at least in part, but used to estimate a needed frame processing rate. Embodiments may leverage the estimate to determine a relative importance (e.g., an importance-score) for work prioritization. In this manner, the online system can be used for safety checks or work prioritization when hardware resources are limited, among other options. Furthermore, it should be appreciated that the online system can also be used in an offline scenario where simulations are used to predict the position information.

Referring again to FIG. 2, an offline timestep analysis chart 200 is disclosed, where the offline timestep analysis chart 200 shows the use of a model to determine a minimum estimated latency from a set of simulation data, and then applies the output in an useful comparison for the offline, or simulated, autonomous vehicle. A frame processing rate estimation model 220 utilizes the process disclosed above to determine an acceptable frame rate estimate for each timestep. The input to the frame processing rate estimation model 220 is a scenario trace 210. The scenario trace 210 includes states of all objects located near the autonomous vehicle in the simulation. States may include location, velocity, and orientation of all the objects in the scene at every timestep, as well as other information that a user may want to include. This state information is provided by way of non-limiting example. Based on the scenario trace 210, the frame processing rate estimation model 220 generates a timestep tolerable latency 230 as an output. The timestep tolerable latency 230 is an estimate at each timestep of the frame processing rate, or latency, that can be tolerated for safe driving conditions. Timestep tolerable latency 230 can be used to ensure that the frame processing rate of the autonomous vehicle system is acceptable. The timestep tolerable latency 230 can also be used to determine a desired FPS 240, which is the inverse of timestep tolerable latency 230.

As shown in an application routine 205, if the autonomous vehicle has static frame processing scheduling, processing all of the frames at the same rate and in a fixed order, and the frame processing rate is set statically before the autonomous vehicle is deployed, then the timestep tolerable latency

230 is compared with the static frame processing rate to validate that the rate used is acceptable. If it is not acceptable, timestep tolerable latency 230 is then used to refine the static frame processing rate. As further shown in application routine 205, the several cameras of the autonomous vehicle have a camera FPS 260, which is typically fixed and often 30 FPS. The camera FPS 260 and a desired FPS 240 can be compared with an FPS perception 250 of the autonomous vehicle system. The FPS perception 250 is the FPS that the hardware of the system can process the camera images. However, as explained above, under certain high stress conditions, the hardware may only be able to process the images at a lower FPS, and therefore perceives a lower FPS as well. In other words, in various embodiments, perception FPS 250 will be less than the actual camera FPS 260. Understanding the difference between camera FPS 260, desired FPS 240, and FPS perception 250 at each time step can allow the system and hardware to be adjusted to operate more effectively.

Alternatively, the timestep tolerable latency 230 can be used to provide additional information to set the frame processing rate requirements for any scenarios or ODDs (Operational Design Domain) selected for the autonomous vehicle. An ODD is a description of the conditions in which an autonomous vehicle is designed to operate safely. ODDs may include acceptable environmental settings for the autonomous vehicle, such as highway, parking, or urban. ODDs may also include site conditions where slightly different behavior is expected. It is contemplated that ODDs may be modes of the autonomous vehicle that can be switched.

Embodiments of the present disclosure may incorporate a kinematics model, among other options, that considers a possibility of a collision to quantity maximum tolerable latency for safe driving. In at least one embodiment, these models, as well as various others within the scope as described herein, may be deployed during a development phase of a software system to verify whether resource allocation for different tasks is sufficient for safety and, in certain embodiments, to provide input to design a more effective system. For example, systems and methods may be used with a variety of different ODDs to provide a maximum tolerable latency requirement per camera to avoid collisions. Furthermore, embodiments may be deployed as part of regression testing. Systems and methods may also be used at runtime to improve the safety of a system. For example the system may utilize the sensing vehicle's and surrounding vehicle's current and predicted future states for per-camera processing rate estimation. As a result, the estimates can be used for online safety checks and/or workload prioritization, as described herein. As a safety check, the processing latency for each camera is checked to be less than the maximum tolerable latency, thus ensuring that the reaction time of the sensing vehicle is fast enough to avoid potential collisions. Additionally, estimates can also be used to prioritize work to ensure that the available hardware resources are utilized based on importance. For example, the processing rate for a less important camera that is sensing/tracking unimportant obstacles can be lowered when sufficient resources are not available to process data from a more important sensor, optimizing the system for comfort and safety. Additionally, dynamic frame processing rate (FPR) adjustment may facilitate improved operations where the hardware system is constrained due to operating conditions or increased delays for some tasks. Embodiments improve hardware resource allocation for important computing tasks to enhance safety in various scenarios.

Systems and methods of the present disclosure may estimate one or more sensor (and in some circumstances each system for a vehicle system) frame processing rate requirements to maintain a threshold safety level. Both an online safety check and a work prioritization workflow may be incorporated in various embodiments to improve safety by better managing available hardware resources.

Figure 3A:
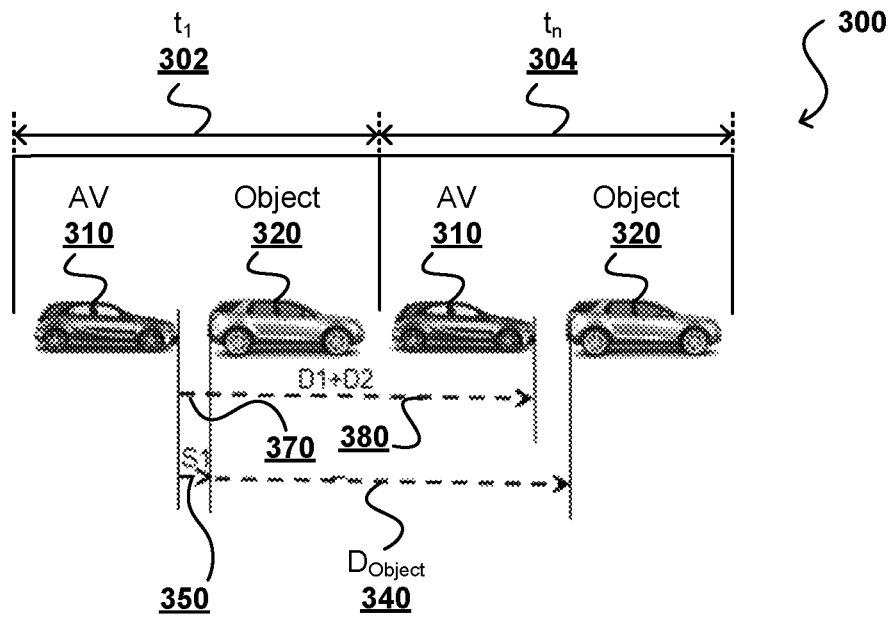
FIGS. 3A and 3B illustrate the movement and operation of an autonomous vehicle over a period of time, according to at least one embodiment.

Referring now to FIG. 3A, a simulation progress 300 over the course of two timesteps to be analyzed by the frame processing rate estimation model 220 is disclosed. It is understood that the simulation progress 300 could be over the course of any number of timesteps. The input to the frame processing rate estimation model 220 is the scenario trace 210 of all the objects locations and velocity at each time step. At the beginning, $t_1$ 302, of simulation progress 300 and the end, $t_n$ 304, of simulation progress 300, the location and velocity of a simulated autonomous vehicle 310 are known. Additionality, the location and velocity of a simulated object 320 near simulated autonomous vehicle 310 are known at $t_1$ 302 and $t_n$ 304. The frame processing rate estimation model 220 may determine how much latency in frame rate processing can be tolerated before the simulated autonomous vehicle 310 reaches the location of simulated object 320 at $t_n$ 304. If the simulated autonomous vehicle 310 reaches the same location as simulated object 320 at $t_n$ 304, a collision will have occurred. In order to avoid ending in a collision, the distance traveled by the simulated autonomous vehicle 310 ($D_1$ 370+$D_2$ 380) in that time duration must be less than the distance traveled, $D_{Object}$ 340, by simulated object 320.

Figure 3B:
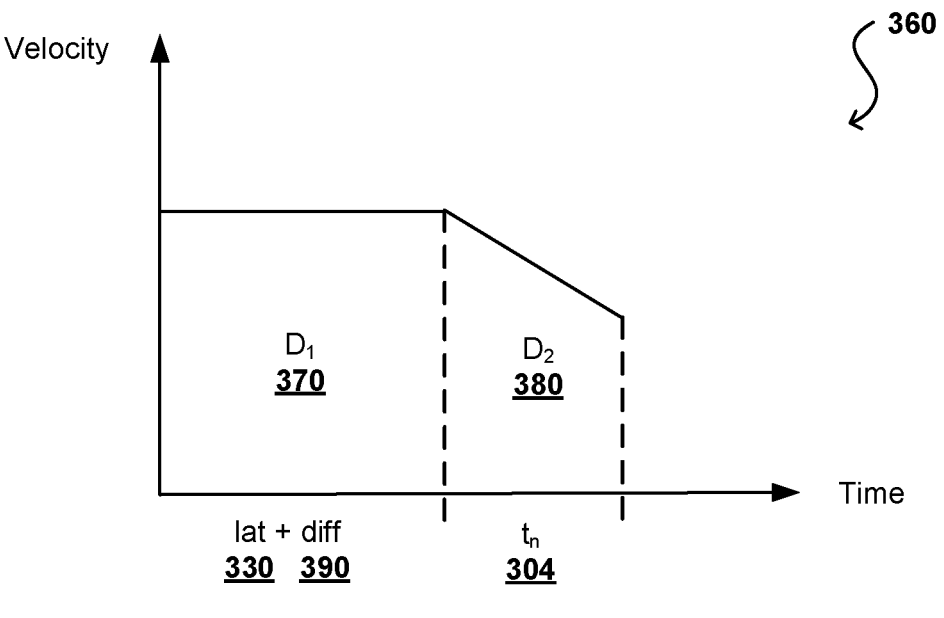

Referring to FIG. 3B, a graph 360 discloses the velocity of the simulated autonomous vehicle 310 over the time of simulation progress 300. While traveling over the first distance $D_1$ 370, simulated autonomous vehicle 310 is detecting other objects and their locations in an accurate manner. This may be described as simulated autonomous vehicle 310 detection time. While traveling over the second distance $D_2$ 380, the simulated autonomous vehicle 310 is reacting to the object 320 in its path and decreasing the velocity of the simulated autonomous vehicle 310. The velocity decrease can be performed by applying brakes or any other suitable method. During the detection time there is no change to the simulated autonomous vehicle 310 behavior and the simulated autonomous vehicle 310 moves forward without perceiving the change of object 320. The frame processing rate estimation model 220 can determine a tolerable latency, lat 330, that the simulated autonomous vehicle 310 can maintain without allowing a collision. It is understood that when the scenario trace 210 is collected, objects are being observed at a certain frame rate, which means that some of the processed information may be delayed because the actions do not happen exactly on each frame. Therefore, a difference, diff 390, in the latency may exist and can be considered when estimating the frame rate and how the detection time may change based on it. To be precise, the diff 390 is calculated with the equation:

$$diff = N * (1/FPS - 1/FPS')$$

Here, N is the number of frames required to confirm an object, also known as the perception delay. For example, an object may be recognized within a first frame, but the object may not be confirmed until the object is verified in one or more subsequent frames. Any reasonable number of frames may be used to confirm the object, with certain embodiments including between three and five frames. FPS' is the default FPS that used to obtain the minimum safety FPS. During the reaction time, the simulated autonomous vehicle 310 begins to react to the change of the object 320 after the change in the object 320 is perceived. The velocity of simulated autonomous vehicle 310 decreases over the course of time $t_n$ 304 in order to prevent a collision. In at least one embodiment, $t_n$ 304 is also known to be represented by the equation:

$$t_n = S_1/\max(1, V)$$

In this example, $S_1$ 350 is pictured in FIG. 3A and is a distance between the simulated autonomous vehicle 310 at $t_1$ 302 and the object 320 at $t_1$ 302. V is the velocity of the simulated autonomous vehicle 310 just before it begins to react to the change of the object 320. It is understood that both equations can assume constant deceleration of the simulated autonomous vehicle 310 and that steering is straight. However, these constraints may not be applicable to each configuration and different assumptions may be included within the scope of the present disclosure. A condition required to avoid a collision in either the x- or y-plane the simulated autonomous vehicle 310 is traveling in is established to satisfy the inequality:

$$D_1 + D_2 \leq S_1 + D_{Object}$$

As noted, the confirmation delay, N, exists when an autonomous vehicle may not start reacting to the change in the environment until it has confirmed that change by having seen the change in the next several frames to confirm that the object exists in the perceived state. In some cases, the confirmation delay can also exist when data is fused from multiple sensors for a certain duration to confirm the state of the object. In some cases, this may be three to five frames and in other cases the number of frames may be more or less, including up to ten or more frames. The number of frames of the confirmation delay may depend on the algorithm that is used to confirm an object position. In certain examples, a decay algorithm can be used to give more weight to recent frames and less weight to older frames when confirming that an object exists. Therefore, if the frame processing rate is changed and the confirmation algorithm depends on how many frames an object appears in, then the processing hardware may require additional real time to confirm the object exists. This results in the autonomous vehicle not reacting to that change in enough time to avoid a collision.

Referring to the inequality discussed above for the condition to avoid a collision, by solving for the x and y components, it is possible to obtain an inequality to model the two components:

$$\text{Latency} \leq \frac{a_{braking}(t_n + \Delta t)^2 - 2(v + \Delta v)(t_n + \Delta t) + 2(S_n + \Delta S_n) + \frac{2(v + \Delta v)N}{FPS'}}{2(v + \Delta v) + 2(v + \Delta v)N}$$

As used here, $a_{braking}$ is the amount of braking the autonomous vehicle can apply after it has perceived the object and determines that a collision should be avoided. Velocity v is the velocity of autonomous vehicle at the current speed at the beginning of the scenario. $S_n$ is the distance traveled by the other actor or object and its current distance, or the combination of $S_1$ and $D_{Object}$, where $D_{Object}$ is the distance traveled by the sensed object for a given number of timesteps. The conservative time window $t_n$ is the time duration used to determine whether there is going to be a collision in the immediate future, and is also defined as $S_n$ divided by v. This is generally a small time-window, generally less than half of a second, but could range from zero to over half of a second. FPS' is the current, or default, FPS the hardware is processing the frames. The deltas throughout inequality represent the deviation of the scenario trace 210 data on the relevant frames from the real-world data (e.g., deviation from ground truth). N, as stated above, is the confirmation delay, or the number of frames required to confirm an object. Knowing all these variables, the latency can be derived using the above inequality in the frame processing rate estimation model 220. In this example, only objects in the same lane as the autonomous vehicle are considered, but in other examples, vehicles and objects in other locations may be considered.

Latency may be computed on a per object basis. Additionally, each object may not be recognized or otherwise detected by each sensor. Accordingly, latencies may be allocated across each sensor that is associated with a particular object. After the latency requirement for each object is computed using the frame processing rate estimation model 220, the minimum of the tolerable latencies across all the objects in each sensor's field of view is determined. For each separate sensor or camera, which are pointed at different angles and different field of views, the number of objects will be different. The required minimum tolerable latencies for all the sensors are aggregated by determining the minimum latency of each sensor in an offline system using the formula:

$$\text{Latency}_{sensor} = \min_{i \in objects} \text{Latency}_{object_i}$$

Accordingly, the latency for a given sensor may be defined or otherwise restricted by the minimum latency for a given object associated with the given sensor. The formula considers the minimum tolerable latency for each sensor to determine how fast each sensor processing should be to ensure safety during operation. Any portion of the model, including the formula above, may be ran in parallel. While this analysis is not contemplated to become a performance bottleneck, it some examples it may be useful to run the processing in parallel, possibly as a method to reduce the response time of the autonomous vehicle. Additionally, this analysis is contemplated to run anywhere on the hardware for processing, including the CPU, GPU, or PVA, based on available resources at the moment or other considerations. In certain examples, the model may be implemented either in CUDA, OpenMP or any other suitable parallel programming constructs either targeted for CPU or GPU.

Returning to the driving scenario of FIG. 3A, embodiments may consider the current and future states of the AVG 310 and the object 320 to determine if a collision is possible. For time, at times to and in, locations may be evaluated such that a desired scenario is that no safety incident, such as a collision, occurs. For the AV 310 to respond to the object 320 (or any other object or obstacle), the AV 310 must perceive the object 320 and react to it. This may be referred to as a reaction time $(t_r)$ and the distance traveled during this time may be referred to as $d_{e1}$. After this period, the AV 310 may employ a safety procedure to avoid a potential collision. Assuming hard braking as the safety procedure (as but one example of a safety procedure), the AV 310 may travel a distance $d_{e2}$ using a deceleration of $a_b$ reaching a velocity of $v_{en}$. This decrease in velocity may substantially conform to FIG. 3B, illustrating a period of time where velocity is constant or substantially constant followed by a decrease in velocity over time. Embodiments may model such behavior as shown:

$$a_b = \max(C3, C_4 \times a_0),$$

where C3 is the minimum braking deceleration and C4 is a constant that accounts for scenarios where braking deceleration may be higher than the current value. For the AV 310 to have no collusion during In, the distance traveled by the AV 310 must be less than the distance between the AV 310 at the time to and the object 320 at $t_n$, which may be referred to as $S_n$. Furthermore, the velocity of the AV 310 must be less than that of the object 320. These two constraints are shown herein, where $v_{an}$ is the velocity of the object 320 at the time $t_n$ and C1 and C2 are constants used to add conservatism to the formulation.

$$d_{e1} + d_{e2} \leq s_n \times C1$$

$$v_{an} \times C2 \geq v_{en} \geq 0$$

In at least one embodiment, the reaction time ($t_r$) is defined as l+a where l is the tolerable latency and a accounts for the AV confirmation delay. As one non-limiting example, a may be modeled as $K \times (l-l_0)$, where K is the number of frames the perception system takes to confirm an object and $l_0$ is the processing latency of the system at to. Based on one or more smoothing and/or filtering algorithms, different models may also be used within the scope of the present disclosure to estimate confirmation delay. Furthermore, at least one embodiment assumes that the AV's acceleration is unchanged.

Various embodiments of the present disclosure may determine a maximum latency that satisfies the constraints presented herein for any In such that $t_n \geq t_r > $ to. Various methods may be deployed within the scope of the present disclosure, but one such non-limiting example is the use of an iterative method that decreases/from a maximum allowed value (e.g., 1s) and searches for a $t_n$ where the two constraints are met. For an l, the algorithm may set t'n=l+a and check whether the constraints are met using the known locations of the AV 310 and the object 320, their velocities, and their accelerations. If the constraints are not met, then adjustments may be made. For example, t', may be incremented by one or more timesteps (e.g., 0.01s) and then the constraints may be rechecked. However, this process may be time consuming, and as a result, various embodiments of the present disclosure may compute $\delta t_n$ based on the unmet constraint(s) to adjust t'$_n$ for the next iteration.

In at least one embodiment, for distance and velocity based constraints, optimizations may compute how long the AV 310 takes to cover a gap ($gap_d=S_n \times C1-d_{e1}d_{e2}$) and to reach the target velocity ($v_{an} \times C2-v_{en}$), respectively. Accordingly, $\delta t_n$ can be updated in accordance with the below:

$$\delta t_n = \begin{cases} \delta t_n^d = \dfrac{v_{en} + \sqrt{v_{en}^2 + 2 \times a_b \times |gap_d|}}{a_b}, & \text{iff } gap_d = C1 \times s_n - d_{e1}d_{e2} \geq 0 \\ \delta t_n^v = \dfrac{gap_v}{a_b}, & \text{iff } gap_v = v_{en} - C2 \times v_{an} \geq 0 \\ \min(\delta t_n^d, \delta t_n^v), & \text{otherwise} \end{cases}$$

Using the above, f t'$_n$ is updated (t'$_n$=t'$_n$+$\delta t_n$), and the constraint checking and t'n update steps are repeated M times (e.g., M=10). If the constraints are not met after M attempts, the procedure may be repeated after decreasing/by δl (e.g., δl=33 ms) until/reaches the minimum allowed value, resulting in a maximum of L=max(l)/δl steps.

Embodiments may predict tolerable latency for all of the predicted estimated trajectories and consider different aggregation functions to obtain a single estimate per actor. For example, maximum provides the most pessimistic estimate and average gives more weight to the most likely future trajectory. Nth percentile of the tolerable latency can also be used in embodiments, where Tis the set of predicted trajectories given by a trajectory predictor.

$$l_{actor} = PR_{n_{th}}\{l_j\}, \text{ for } j \in T$$

Additionally, using the per-actor tolerable latency, embodiments may obtain a per-camera FPR requirement by considering all surrounding objects within each camera's field of view (FOV), where A is the set of objects in the camera's FOV.

$$FPR_{sensor} = \frac{1}{l_{sensor}} = \frac{1}{\min_{i \in A} l_{actor_i}}$$

Figure 4A:
FIG. 4A illustrates an example offline timestep analysis chart that can be utilized, according to at least one embodi-ment.
Figure 4A:
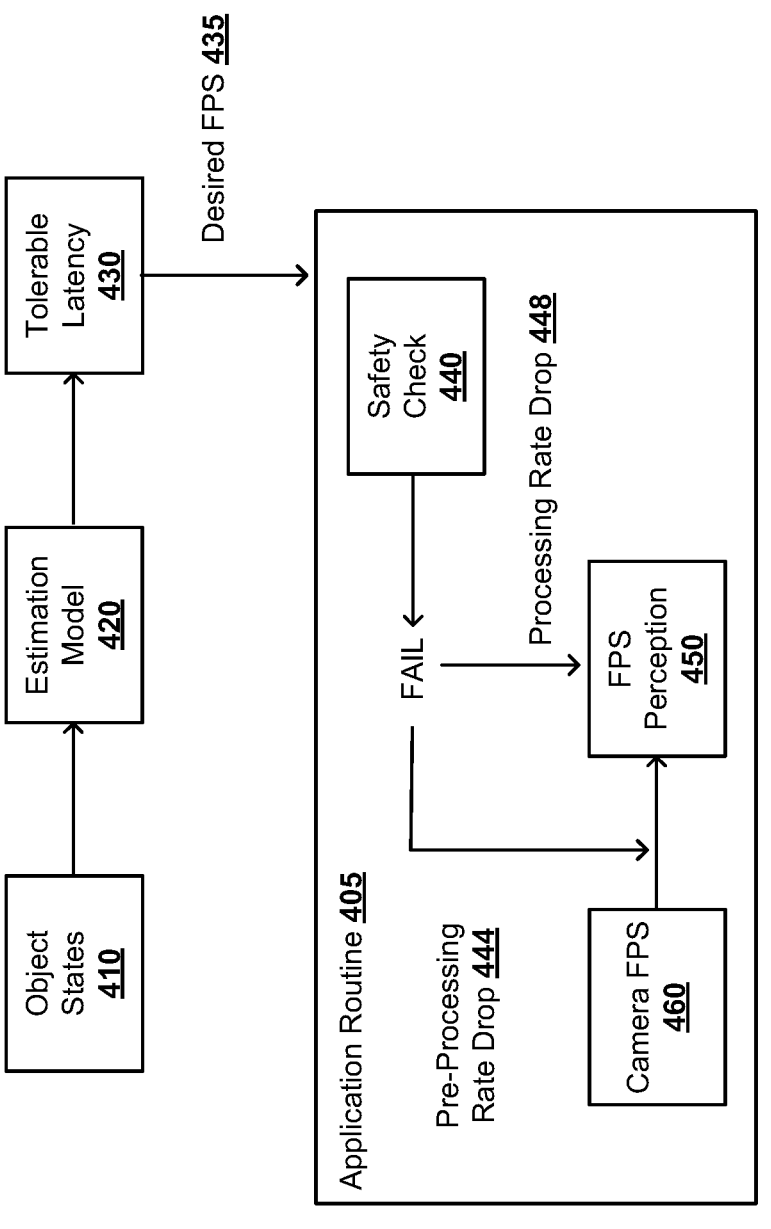

Referring now to FIG. 4A, an online timestep analysis chart 400 is illustrated, where the online timestep analysis chart 400 shows the use of a model to determine a minimum estimated latency from a set of real world data, and then applies the output in an useful comparison for the online, or real world, autonomous vehicle. While the results from the offline timestep analysis chart 200 provided a useful prediction of the minimum tolerable latency for each sensor, in online applications the future locations and movements of objects near the autonomous vehicle are not known. Therefore, a DNN (Deep Neural Network) is used, such as PredictionNet, which predicts the future state of the other objects near the autonomous vehicle. A frame processing rate estimation model 420 utilizes the process disclosed for the offline model to determine an acceptable frame rate estimate for each timestep but using real world data and the output data from a DNN as an input. The input to frame processing rate estimation model 420 is comprised of object states 410. Object states 410 may include current state, past states, and the output of the Prediction Net, which predicts the future states of the detected objects. Each state may include location, velocity, and orientation of all objects in the scene detected by the autonomous vehicle at every timestep, as well as any other information that may be desired. Based on object states 410, frame processing rate estimation model 420 is able is generate timestep tolerable latency 430 as an output. The frame processing rate estimation model 420 uses the same latency formula as provided above for the frame processing rate estimation model 220. The timestep tolerable latency 430 is an estimate at each timestep of the frame processing rate, or latency, that can be tolerated for safe driving conditions. The timestep tolerable latency 430 can be used to ensure that the frame processing rate of the vehicle system is acceptable. In at least one embodiment, the timestep tolerable latency 430 may be used to determine a desired FPS 435, which is the inverse of timestep tolerable latency 430, as noted above.

As shown in an application routine 405, the desired FPS 435, the inverse of tolerable latency 430, can be used with safety check 440 to determine if the current frame processing rate of the autonomous vehicle hardware is less than the tolerable latency 430 at each timestep. If the current frame processing rate is less than or equal to the tolerable latency 430, the system does not need to be altered to ensure safe operation. However, if the current frame processing rate is greater than the tolerable latency 430, then an action should be taken to ensure safety. One contemplated action would be to raise an alarm to alert backup systems that the frame processing rate is not high enough. Another option when the safety check 440 fails is to implement a work prioritization for the autonomous vehicle hardware. In a first example, the autonomous vehicle system may limit the bandwidth that is sent to the hardware for processing through a pre-processing rate drop protocol 444. The several cameras of the autonomous vehicle have a camera FPS 460, which is typically fixed and often 30 FPS. During preprocessing, the FPS of the feed from one or more of the cameras can be decreased to reduce the workload of the hardware. In certain instances, only feeds from low priority cameras may have their camera FPS 460 reduced. In a second example, the autonomous vehicle system may limit the computation resources used to process low priority frames and allocate the extra resources to process high priority frames through a processing rate drop protocol 448. An FPS perception 450 of the autonomous vehicle system is the FPS that the hardware of the system can process the camera images. Using the processing rate drop protocol 448, FPS perception may be reduced in order to reduce the workload of the hardware. In one or more embodiments, the optimization process could be used to determine the latency of any operations for comparison with the available resources, which would allow the resources to be reallocated more effectively.

In some embodiments, if one processor drops below the minimum tolerable latency, the number of frames which can be dropped from the other sensors before they hit the minimum can be calculated. It can then be determined if dropping frames from other sensors will satisfy the minimum tolerable latency. If it does, the number of frames that can be dropped from the other sensors can be calculated. In certain situation, when all the minimum processing FPS thresholds for all sensors are known and the processing for each sensor is within an acceptable range, available excess processing capacity may be allocated evenly across some or all of the cameras, or allocated based on prioritization. Additionally, the estimation model may provide a normalized minimum latency estimation over a specific period of time or number of frames, or to set the processing for one or more cameras at a higher rate while one or more other cameras are processed at a lower rate. When it is determined that a higher frame rate will be needed, it may be preferable to process at a higher rate which will result in increased comfort. For example, if there are more detected objects in the front of the autonomous vehicle, and there are no detected objects on the side, and the minimum sensor processing rate we predict is one FPS for the side cameras and six FPS for the front camera while there are excess hardware resources, it may be preferable to increase the resources for the front cameras at a normalize frame processing rate while keeping the side camera processing hardware resources low until some future time.

In certain instances, it may be beneficial to distinguish objects based on their types, such as if they are movable or non-movable. Generally, it is understood that the predictive DNN can provide the needed future states of the objects, however if this becomes a bottleneck, then making this distinction may be useful. Additionally, in instances where a priority of the objects is known from the previous round, they can be carried forward in a temporal manner or can indicate a de-prioritization of certain objects that will not have an impact. Another embodiment may take the DNNs which detect the object and determine the object categories, such as a pedestrian or a car, and use that categorization from the DNN to prioritize or deprioritize certain sensor processing. When applying optimizations that will affect a DNN, the function of the DNN may be changed. While the DNN is trying to estimate the same output, and while the results may be somewhat similar they will need to be monitored to ensure the performance is acceptable in all of the operational conditions because the input to the DNN has changed. For instance, reducing the model size or the input resolution, or dropping color may negatively affect the DNN operation in rain or some other conditions.

Figure 4B:
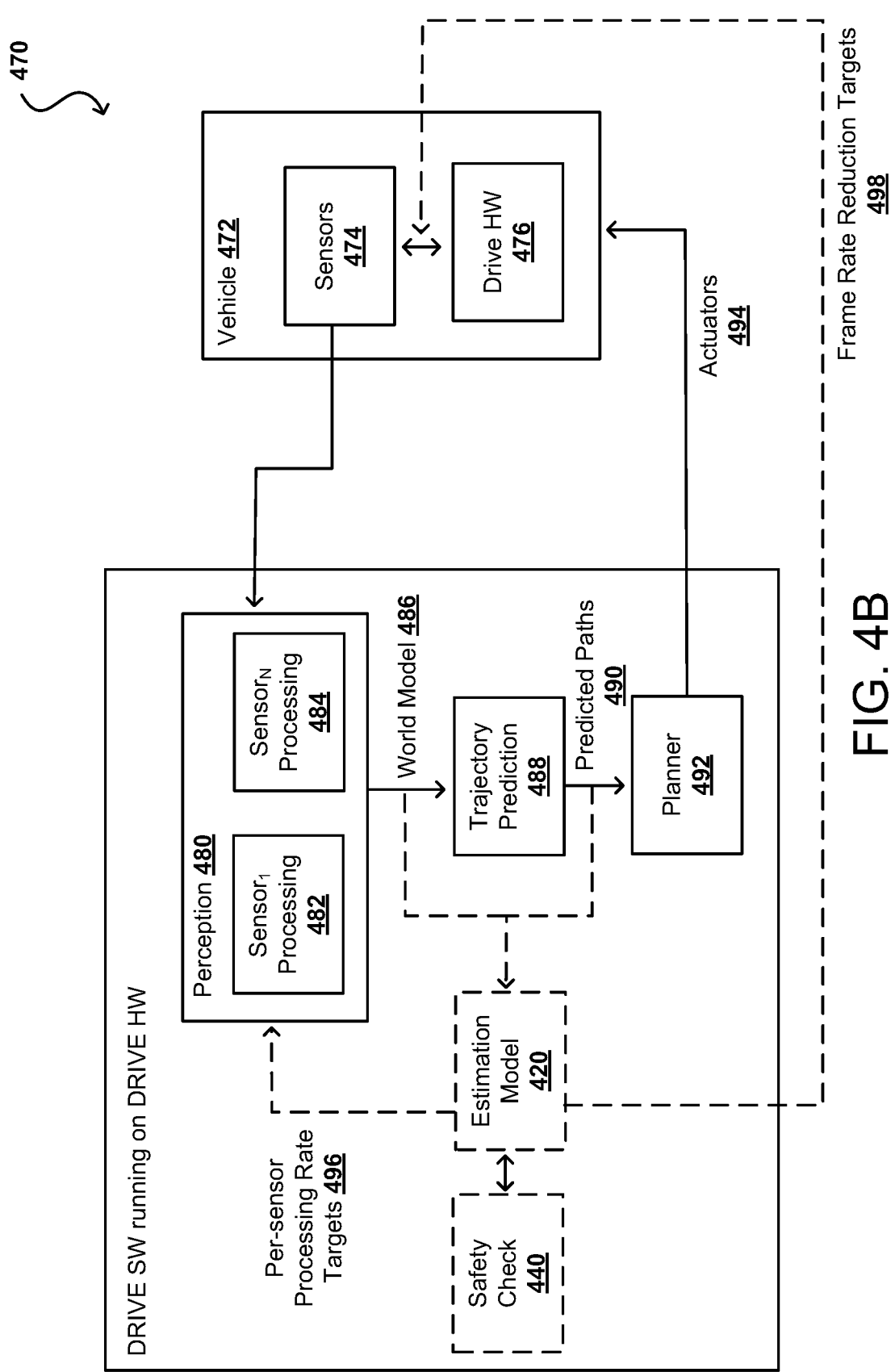
FIG. 4B illustrates components of a system for operating an autonomous vehicle, according to at least one embodi-ment.

Referring now to FIG. 4B, a simplified drive software 470 is illustrated for an autonomous vehicle. It is contemplated that the drive software 470 may have additional subparts, but only those that are relevant at this time are shown here for simplicity and clarity. The elements of FIG. 4A in solid lines are those of an autonomous vehicle system that is currently available and understood. Also shown is autonomous vehicle 472, which can represent a simulated autonomous vehicle or a real-world autonomous vehicle. Vehicle sensors 474 sense the environment and the drive hardware platform 476 computes the work. As the sensor information comes in (e.g., as data is acquired and transmitted, which may include one or more processing or evaluation steps), it is received by sensor$_i$ processing unit 482 and sensor$_N$ processing unit 484, where sensor$_N$ processing unit 484 represents however many more sensor processing units are needed, which are located within the perception stack 5480. It is contemplated that multiple sensors are represented by vehicle sensors 474, and the data from the sensors are processed independently and then merged to obtain a world model 486. Then, the world model 486 is used by trajectory prediction unit 488 to determine the predicted paths 490 of the other objects detected near the autonomous vehicle 472. The predicted paths 490 are then used by planner 492 to properly plan how actuators 494 will operate, sending actuator instructions to autonomous vehicle 472.

Referring still to FIG. 4B, the elements shown in dashed lines represent contemplated addition and improvements to a currently available autonomous vehicle system. In one exemplary example, world model 486 and the predicted paths 490 are used as inputs to the estimation model 420. The estimation model 420 predicts per-sensor processing rate targets 496 for sensors 474 individually. The per-sensor processing rate targets 496 are sent as an input to the perception stack 480, where one or more of sensor$_i$ processing unit 482 and sensor$_N$ processing unit 484 rates are altered to meet the hardware processing constraints at that time.

As shown, estimation model 420 output can also be used as an input for safety check 440. If safety check 440 fails, then as discusses above, a protocol can be used to adjust one or more of sensor processing unit 482 and sensor$_N$ processing unit 484 rates. An alternative contemplated process if safety check 440 fails is to invoke a backup system or perform some other action, such as send an alert to degrade performance. The estimation model 420 is also contemplated to send frame rate reduction targets 498 with instructions that one or more sensors 474 must operate at a minimum amount of processing latency, which could include a range or an optimal target. The frame rate reduction targets 498 may be triggered by failing a safety check 440. If a camera is running at its limit of 30 FPS, and the predicted processing rate is four FPS, processing at any rate above four FPS is considered safe. The higher the processing rate is, the more comfortable the ride will become. However, if the processing rate drops below four FPS, a safety concern is created. Therefore, a range may be provided from a lowest acceptable processing rate, up to the maximum operating FPS.

One contemplated operation using these features provides that when a safety check is failed, a minimum risk maneuver can be executed to stop the vehicle in the safest way possible. Another contemplated operation is to determine that the minimum latency for an important sensor is not being met, another sensor's processing can be degraded, at least temporarily, and more resources provided to the important sensor. Another option to consider at that time is to determine if the hardware performance can be increased for a short duration. The system may be operating at a fixed frequency so that a thermal threshold is not exceeded, but the frequency could be changed to briefly increase performance to ensure safe driving conditions. It is contemplated that his could be done dynamically. Another operation is to select an alternate version of the functionality. For example, a lower latency algorithm or an algorithm that executes on a different processor (for example, executing on a DLA instead of the GPU) may be selected.

In one exemplary example, when all the minimum processing thresholds have been set and enough resources are still not available to provide the requested processing rates, safety may not be guaranteed, and the driver should be notified. The autonomous vehicle can then operate at a degraded mode where certain functionality is disabled. In another exemplary example, in order to improve performance of the hardware, smaller, highly optimized perception, trajectory prediction, and planner models may be used instead of the standard model for a certain duration. Allowing fewer hardware resources to be utilized running these models and instead using them to process frames can prevent dropping the frame processing rate. The estimation model is still operating, but instead of triggering a process to drop certain frame processing rates, the smaller model is ran in an infrequent manner. In most cases the appropriate functions of the models do not change, and their properties do not change significantly.

Regarding the latency aggregation for the online, or real world, autonomous vehicle, a small change is found in comparison to the offline formula described above. In the offline formula, the simulation provided exact information about where the detected object would be in the future (e.g., a known ground truth). However, for a real-world autonomous vehicle, this data depends on the output of the prediction model. Certain prediction models provide the point prediction of the expected location of the detected objects. Other prediction models provide a probabilistic model, or a small range of values, of the predicted location of the detected objects. A probabilistic model provides a distribution of the expected future state of the detected objects, which should be incorporated into the latency estimation. Therefore, the minimum latency of each sensor in an online system is determined using the formulas:

$$\text{Latency}_{object} = \sum_{j=1}^{all\_predicted\_paths} \text{Latency}_j P_j(\text{Path})$$

$$\text{Latency}_{sensor} = \min_{i \in objects} \text{Latency}_{object_i}$$

The first formula represents that if there if a certain probability associated with the predicted future location of a detected object, the probability will be used to aggregate the latency requirement for a specific detected object. $P_j$ is the confidence, or probability, of a predicted path for an object. The second formula is the same as the formula used for the offline sensor aggregation, where once a latency estimate for each object is obtained, the minimum latency of the sensor can be determined.

In an embodiment, it is contemplated that the autonomous vehicle system may be able to examine the trends of the hardware usage, the tolerable latencies, and any other relevant factors to determine whether in the future resources available to process the frames may become limited, and take preventive action against this. A large amount of hardware resources are used to process the image feeds from cameras and other censors. Generally, these may be cameras, radar, LIDAR, and ultrasonic sensors monitoring outside of the vehicle. However, in some embodiments internal imaging systems or internal sensors may be monitored by the estimation model. Additionally, internal imaging systems or internal sensors could be one of the first targets to degrade resource processing performance before degrading external sensing, as internal imaging systems or internal sensors are not generally safety critical. Other systems could also be degraded as well before degrading external sensing. It is contemplated that at least any type of sensor of the autonomous vehicle that has a notion of periodic detection could be analyzed by the estimation model and then either have hardware performance degraded or increased for its processing.

FIG. 5 illustrates a flow chart for an example process 500 to evaluate a desired FPS for an autonomous vehicle. For this process, and all processes described herein, additional or fewer steps may be performed. Additionally, steps may be performed in any order, in parallel, or partially in parallel, unless otherwise specifically stated. In this example, a simulation is executed for an autonomous vehicle and one or more objects 502. For example, one or more software simulations may determine a current or future location of one or more autonomous vehicle and/or associated objects, such as other vehicles, pedestrians, animals, and the like.

In at least one embodiment, a state for each of the autonomous vehicle and the one or more objects is determined from the simulation 504. The state may be provided of a period of timesteps (e.g., a duration of time) with state information identified for each individual timestep. State may include a position, a velocity, an orientation, or the like, as noted above. In certain embodiments, one or more estimation models may be used to determine a tolerable latency based, at least in part, on the state information. Accordingly, tolerable latency may be determined for the state information at each timestep 506.

Various embodiments include a determination a desired FPS based, at least in part, on the tolerable latency 508. In certain embodiments, desired FPS is equal to the inverse of tolerable latency. This information may then be compared to a perception FPS associated with one or more sensors of the autonomous vehicle 510. The perception FPS may correspond to processing capabilities of underlying hardware for different sensors of the autonomous vehicle. For example, while a sensor may have a first FPS, competing demands on the hardware resources may reduce the sensor FPS to the perception FPS. The comparison between the perception FPS and the desired FPS may be used to make a determination 512 of whether or not the perception FPS is sufficient for safe operations. If the tolerable latency is less than the perception FPS, then additional simulations over different timesteps can continue. However, if the tolerable latency exceeds the perception FPS, then one or more remedial actions may be taken 514, such as sounding an alarm, adjusting processing capabilities, and the like.

Figure 5B:
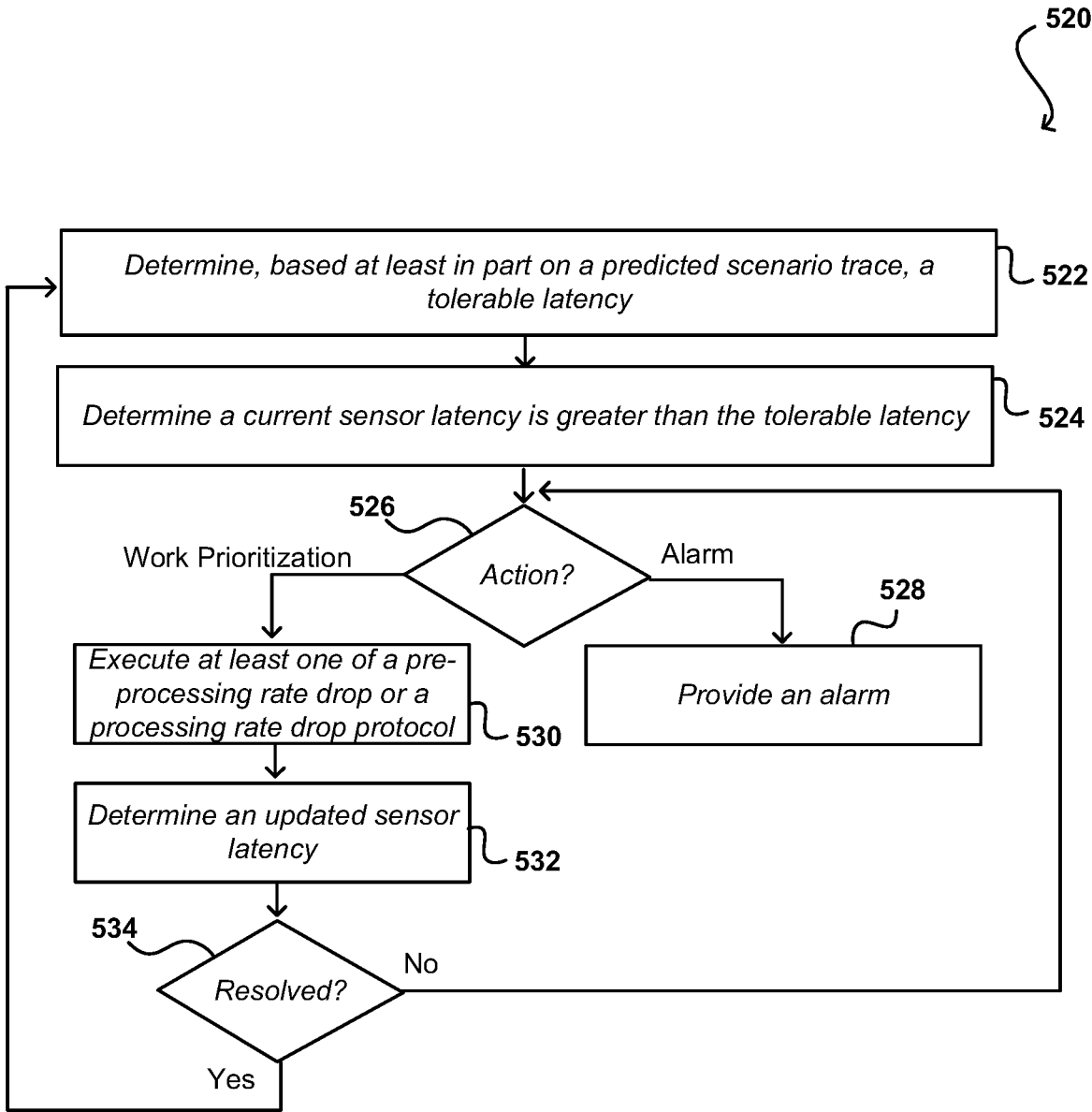
FIG. 5B illustrates a flow chart of an example of a process to perform a remedial action based on sensor latency, according to at least one embodiment.

FIG. 5B is a flow chart of an embodiment of a method 520 for applying a safety check to determine whether a processing rate is greater than a tolerable latency. In this example, a tolerable latency is determined 522. In certain embodiments, tolerable latency may be associated with an online scenario in which states of different objects are predicted, for example using one or more DNNs. These predictions, which may be associated with a scenario trace providing predicted information such as speed, direction, orientation, future position, etc., may be used to determine the tolerable latency. The tolerable latency, or one or more forms of tolerable latency (such as desired FPS), may be used with a safety check. For example, a current sensor latency may be compared to the tolerable latency and it may be determined that the current sensor latency is greater than the tolerable latency 524. As a result, one or more actions may be selected 526. Actions may include different paths in order to alert an actor to the current situation regarding the sensor latency, to alert a system to adjust resource use, or the like. For example, in an embodiment, an alarm may be provided 528 to alert an actor regarding the failure of the safety check. From there, one or more remedial actions may be executed, such as stopping the vehicle or adjusting resource utilization, among other options.

In another embodiment, work prioritization may be executed in order to adjust one or more operating parameters. For example, at least one of a pre-processing rate drop or a processing rate drop protocol may be initiated 530. As noted above, these different protocols may be used to adjust how resources are used in an effort to decrease the latency and/or increase a perception FPS. An updated sensor latency may then be determined 532 and, if that has resolved the issue, the process may continue from the start. However, if the work prioritization has not resolved the issue, then additional actions may be evaluated.

FIG. 5C illustrates a flow chart of an example process 540 for determining a sensor latency. In this example, a plurality of objects are detected using a plurality of sensors 542. For example, a first sensor may detect two objects while a second sensor detects three objects, where there may be overlap between the objects detected by the two sensors. In at least one embodiment, an object is selected from the plurality of objects 544 and a latency for the selected object is determined 546. As noted above, latency may be determined using an estimation model, and in various embodiments, may be based on simulated data or on predicted data. It may be determined whether additional objects have been detected or whether additional sensor latencies can be determined 548.

Once each object latency is determined, or when a threshold number have been determined, a sensor may be selected from the plurality of sensors 550. Additionally, in at least one embodiment, one or more objects associated with the sensor are determined 552. For example, as noted, each sensor may not detect each object. However, a sensor may detect more than one object. A lowest latency from the selected objects associated with the sensor may be determined 554. For example, the respective object latencies may be compared and then a minimum may be selected and assigned as the sensor latency 556. By assigning the minimum latency to the object, the sensor is ensured to obtain sufficient information for each associated object. It may be determined if there are additional sensors 558, and if so, the process may repeat to determine respective sensor latencies. If not, then a plurality of sensor latencies may be provided for use with an estimation model 560.

Various approaches presented herein are lightweight enough to execute on various types of devices or systems, such as smart vehicles, robots, servers, personal computers, smart vehicles, or automated equipment, in real time. Such processing can be performed using data that is captured or generated on that device or system, or received from an external source, such as sensor or map data received over at least one network. The source can be any appropriate source, such as a separate client device, device management system, or third party data provider, among other such options. In some instances, the processing and/or use of this data may be performed by one of these other devices, systems, or entities, then provided to a vehicle (or another such recipient) for use.

Figure 6:
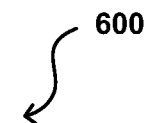
FIG. 6 illustrates components of a system for determining a navigation path, according to at least one embodiment.
Figure 6:
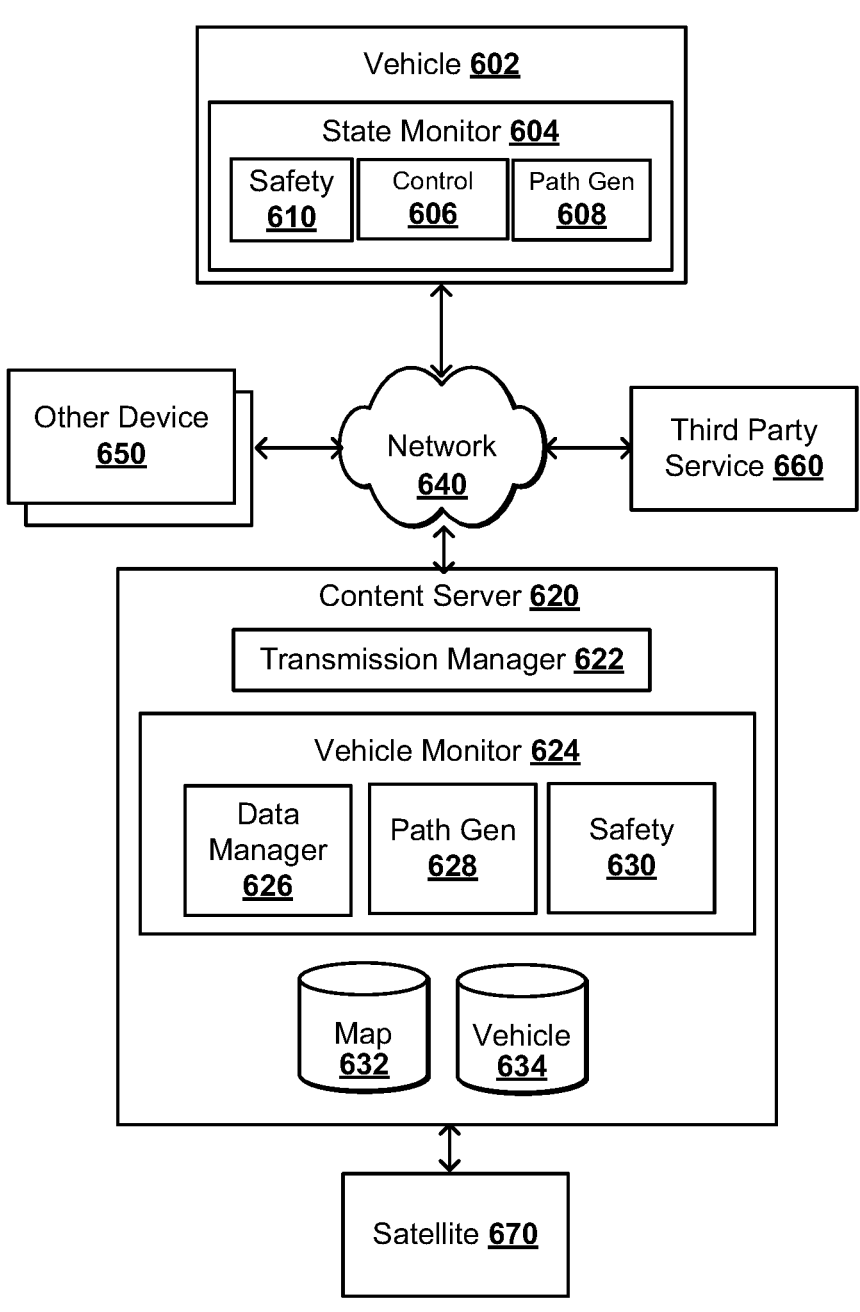

As an example, FIG. 6 illustrates an example network configuration 600 that can be used to provide, generate, modify, encode, and/or transmit data. In at least one embodiment, a vehicle 602, or other automated or semi-automated device or system, can generate or receive data using components of a state monitoring application 604 on the vehicle 602 and data stored locally on that vehicle. In at least one embodiment, a vehicle monitoring application 624 executing on a data or content server 620 (e.g., a cloud server or edge server) may initiate a session associated with at least vehicle 602, as may utilize a session manager and user data stored in a vehicle database 634, and can cause content relating to paths, localization, or operation to be determined or managed by a data manager 626. A path generation module 628 may attempt to utilize data from various sources to provide map, path, or localization data to the vehicle 602, using information that may be stored locally in a map database 632, received from a third party service 660, or received from a satellite 670, among other such options. Compliance of this data with one or more safety requirements may be determined using a safety module 630. In at least some embodiments, this data may intended to at least be redundant with data determined on the vehicle 602. At least a portion of this data may be transmitted to the vehicle 602 using an appropriate transmission manager 622 to send by download, streaming, or another such transmission channel. An encoder may be used to encode and/or compress this data before transmitting to the vehicle 602. In at least one embodiment, a vehicle 602 receiving this data can provide this data to a corresponding state monitor 604, which may also (or alternatively) include a path generator 608 and safety compliance module 6104 for analyzing data received to, or captured by, the vehicle 602 and generating or selecting appropriate operational instructions or determinations to provide to a control system 606 for the vehicle, such as may cause the vehicle to navigate along a determined path. A decoder may also be used to decode data received over the network(s) 640 as appropriate. In at least one embodiment, at least some of this data (e.g., map data or historical perception data) may already be stored on, generated on, or accessible to vehicle 602 such that transmission over network 640 is not required for at least that portion of data, such as where that data may have been previously downloaded or stored locally on a hard drive or optical disk. In at least one embodiment, a transmission mechanism such as data streaming can be used to transfer this data from server 620. In at least one embodiment, at least a portion of this data can be obtained, determined, or streamed from another source, such as separate client device 650 or a third party service 660 that may also include functionality for making relevant determinations. In at least one embodiment, portions of this functionality can be performed using multiple computing devices, or multiple processors within one or more computing devices, such as may include a combination of CPUs and GPUs.

In this example, devices can include any appropriate devices with computing or sensing capability, as may include a vehicle, robot, automated system, desktop computer, notebook computer, set-top box, streaming device, gaming console, smartphone, tablet computer, smart vehicle, robotic-assisted machine, VR headset, AR goggles, wearable computer, or a smart television. Each device may be able to transmit and receive requests across at least one wired or wireless network, as may include the Internet, an Ethernet, a local area network (LAN), or a cellular network, among other such options. In this example, these requests may be submitted to, or received from, an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for automation operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
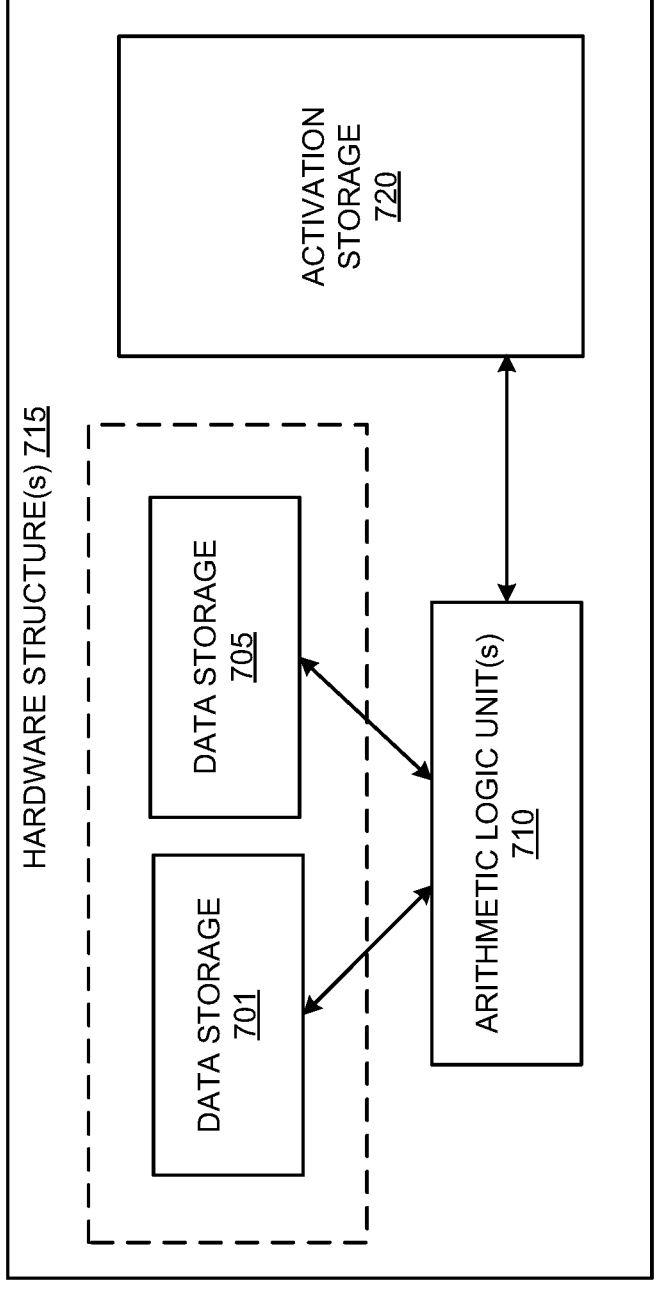
FIG. 7A illustrates inference and/or training logic, accord-ing to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
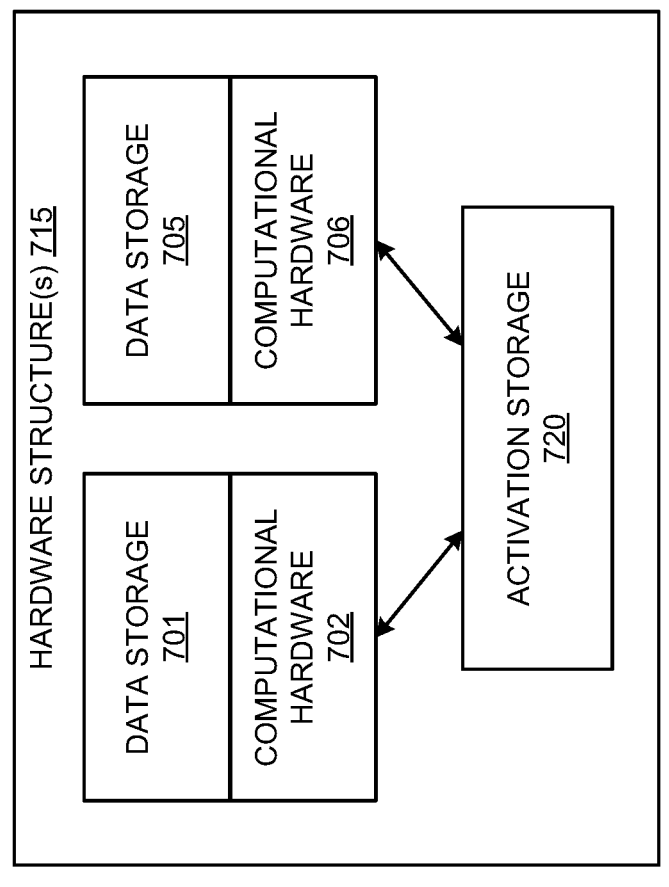
FIG. 7B illustrates inference and/or training logic, accord-ing to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
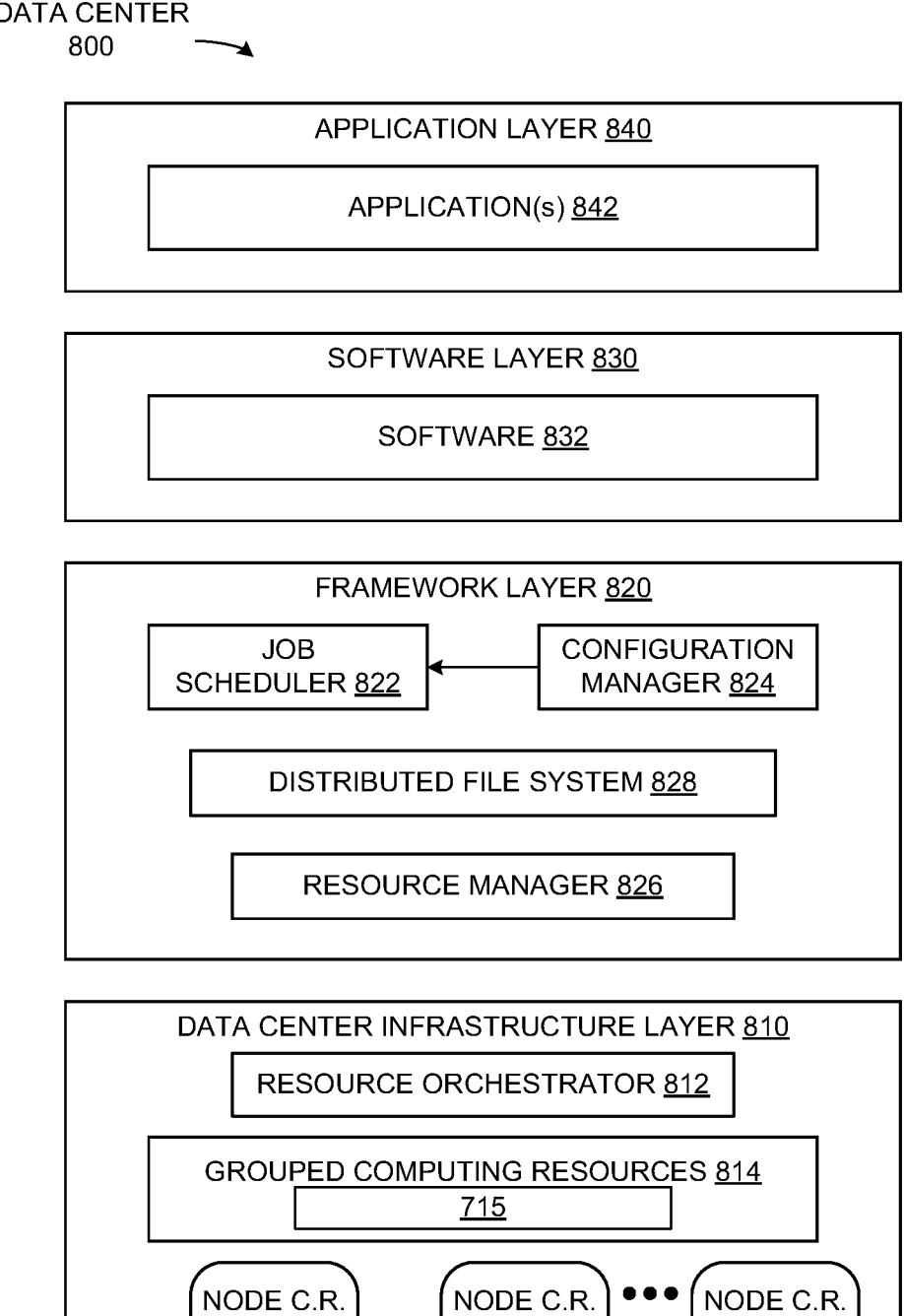
FIG. 8 illustrates an example data center system, accord-ing to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Computer Systems

Figure 9:
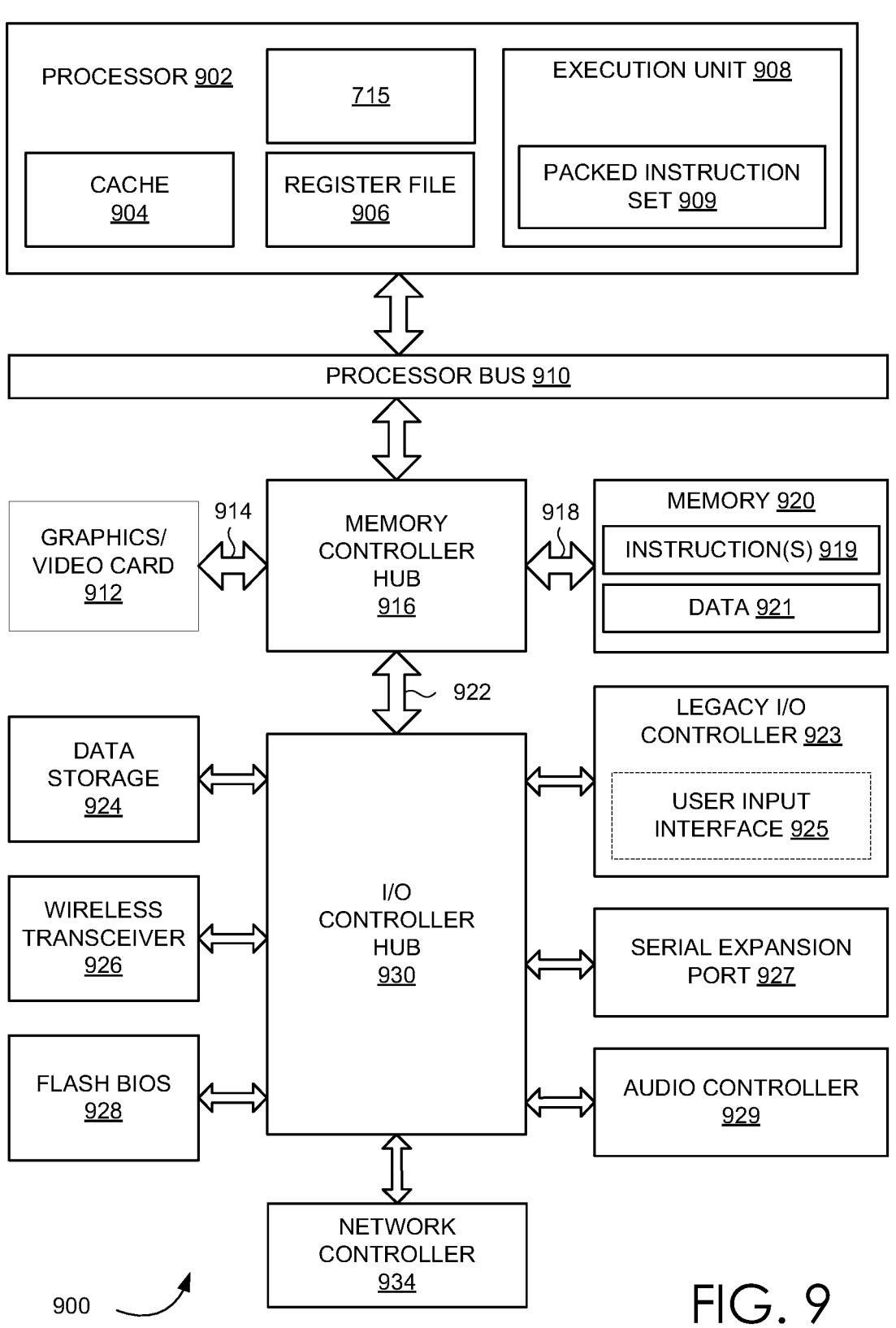
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS.

7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Figure 10:
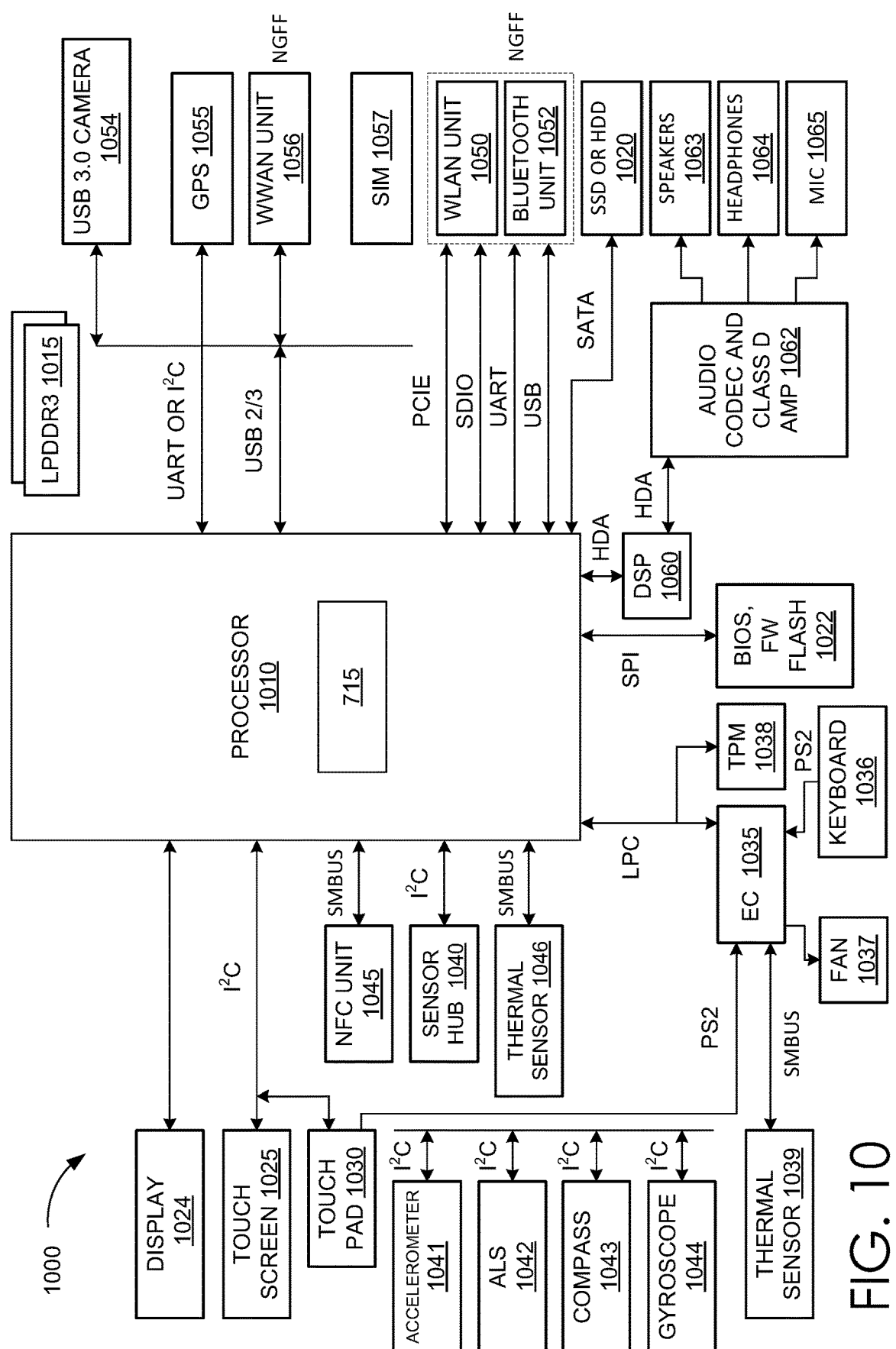
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Figure 11:
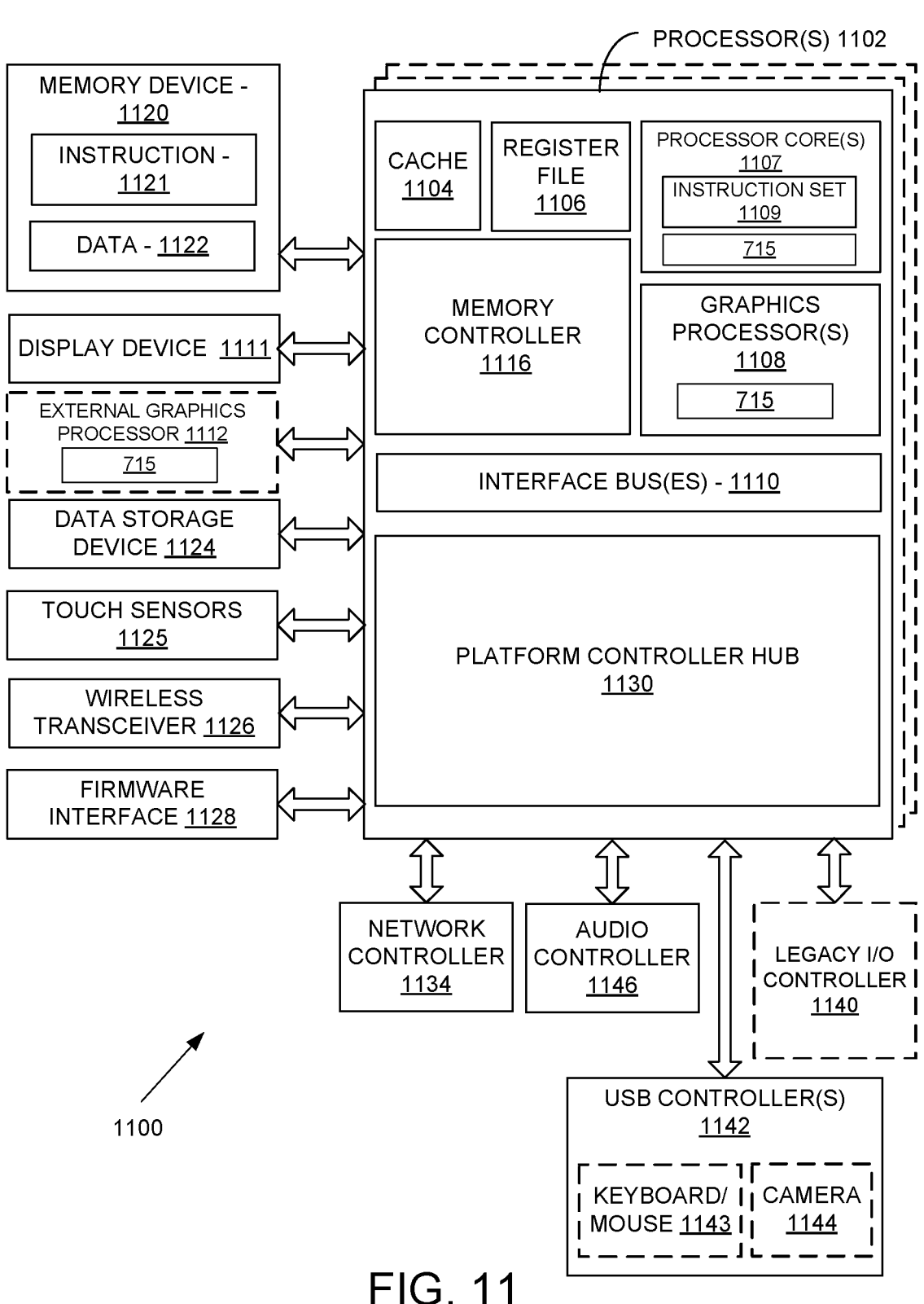
FIG. 11 illustrates at least portions of a graphics proces-sor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to composite constituent images into a single representation using parameters determined from one or more quality assessment values.

Figure 12:
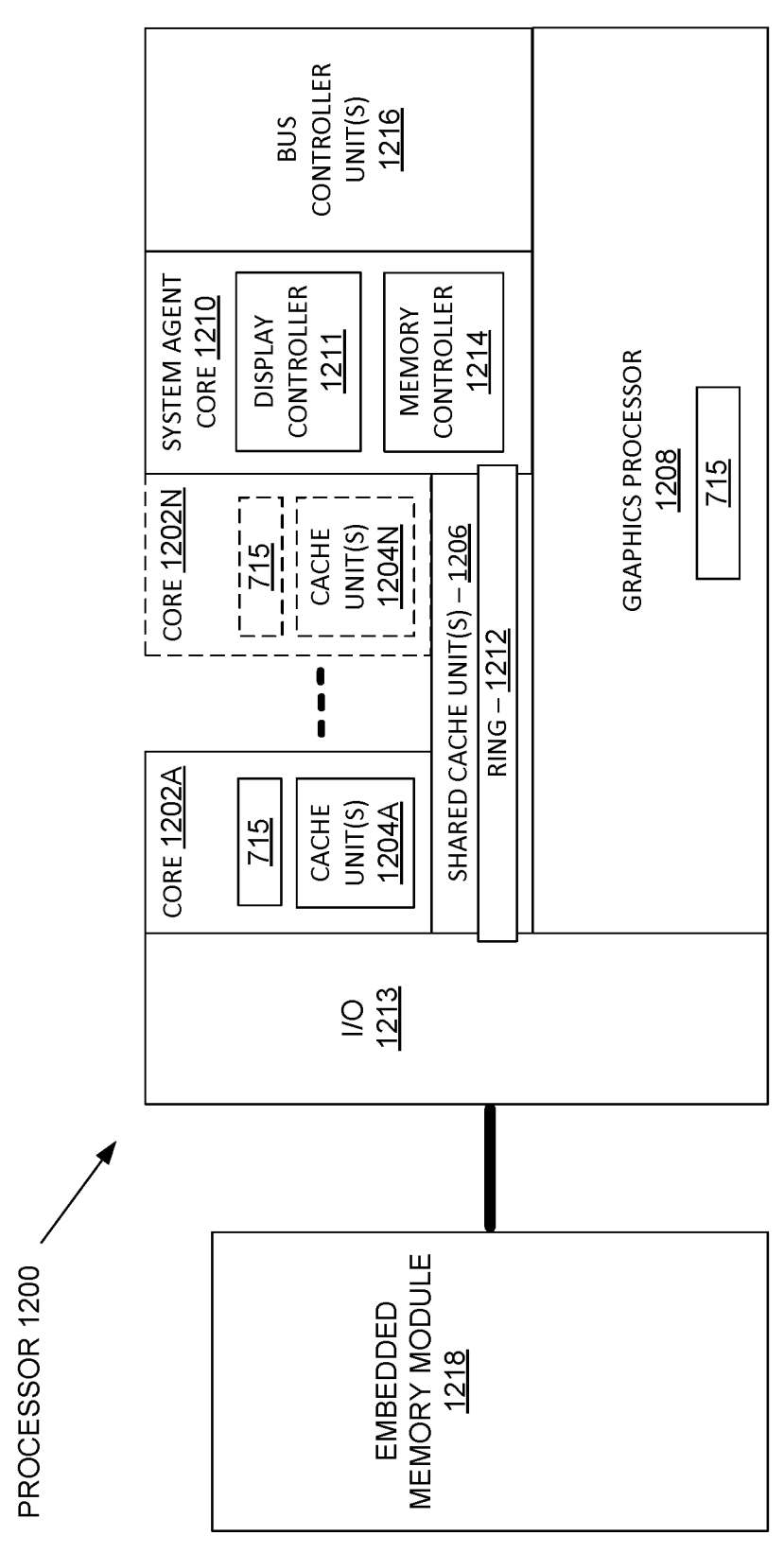
FIG. 12 illustrates at least portions of a graphics proces-sor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to composite constituent images into a single representation using parameters determined from one or more quality assessment values.

Virtualized Computing Platform

Figure 13:
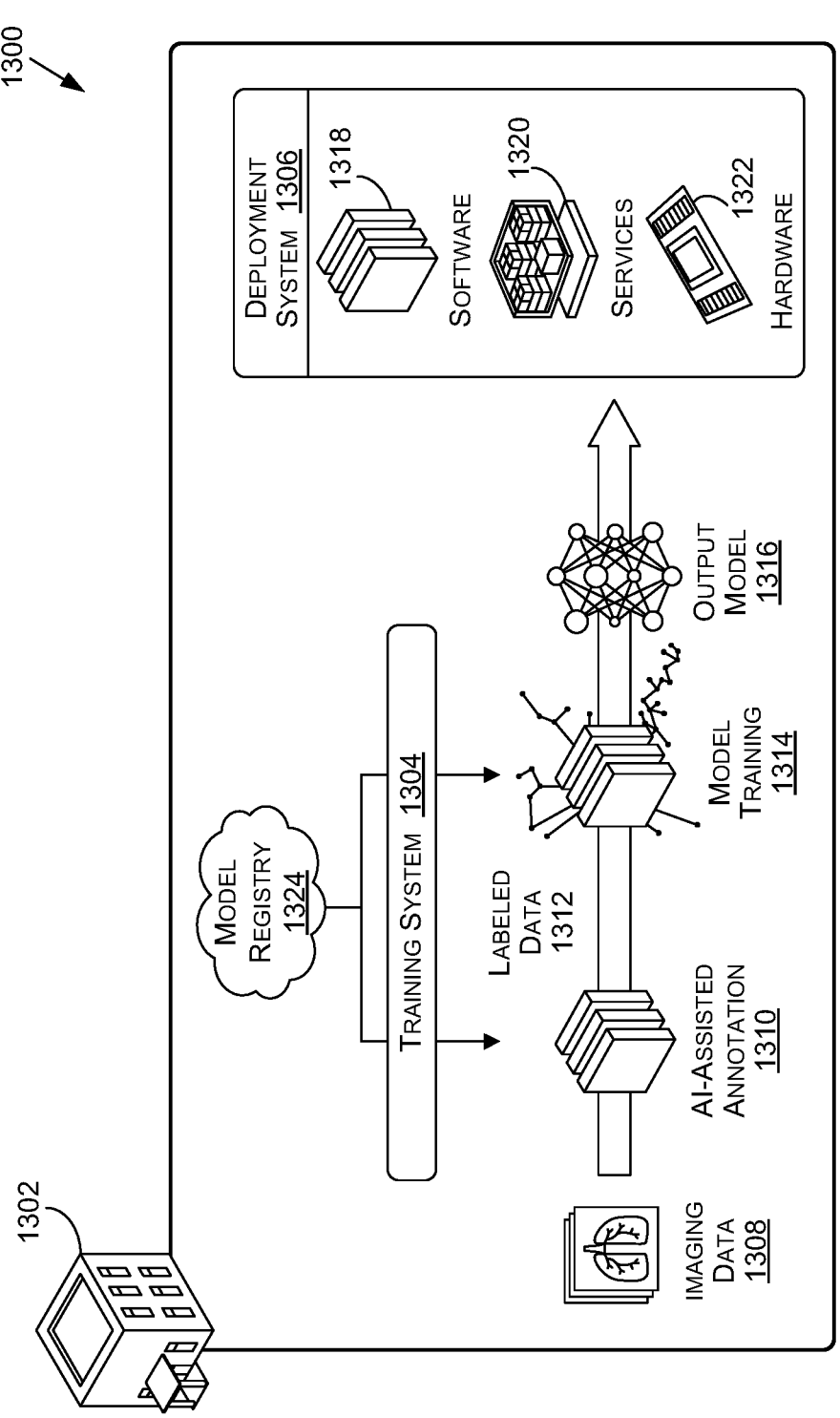
FIG. 13 is an example data flow diagram for an advanced computing pipeline, in accordance with at least one embodi-ment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of container-ized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodi-ment, AI-assisted annotations 1310 may then be used directly, or may be adjusted or fine-tuned using an annota-tion tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deploy-ment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or opti-mized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corre-sponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmenta-tion, image enhancement, calibration, etc.). In at least one embodiment, an advanced processing and inferencing pipe-line may be defined based on selections of different con-tainers that are desired or required for processing imaging data 1308, in addition to containers that receive and con-figure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hard-ware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations gen-erated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipe-line to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
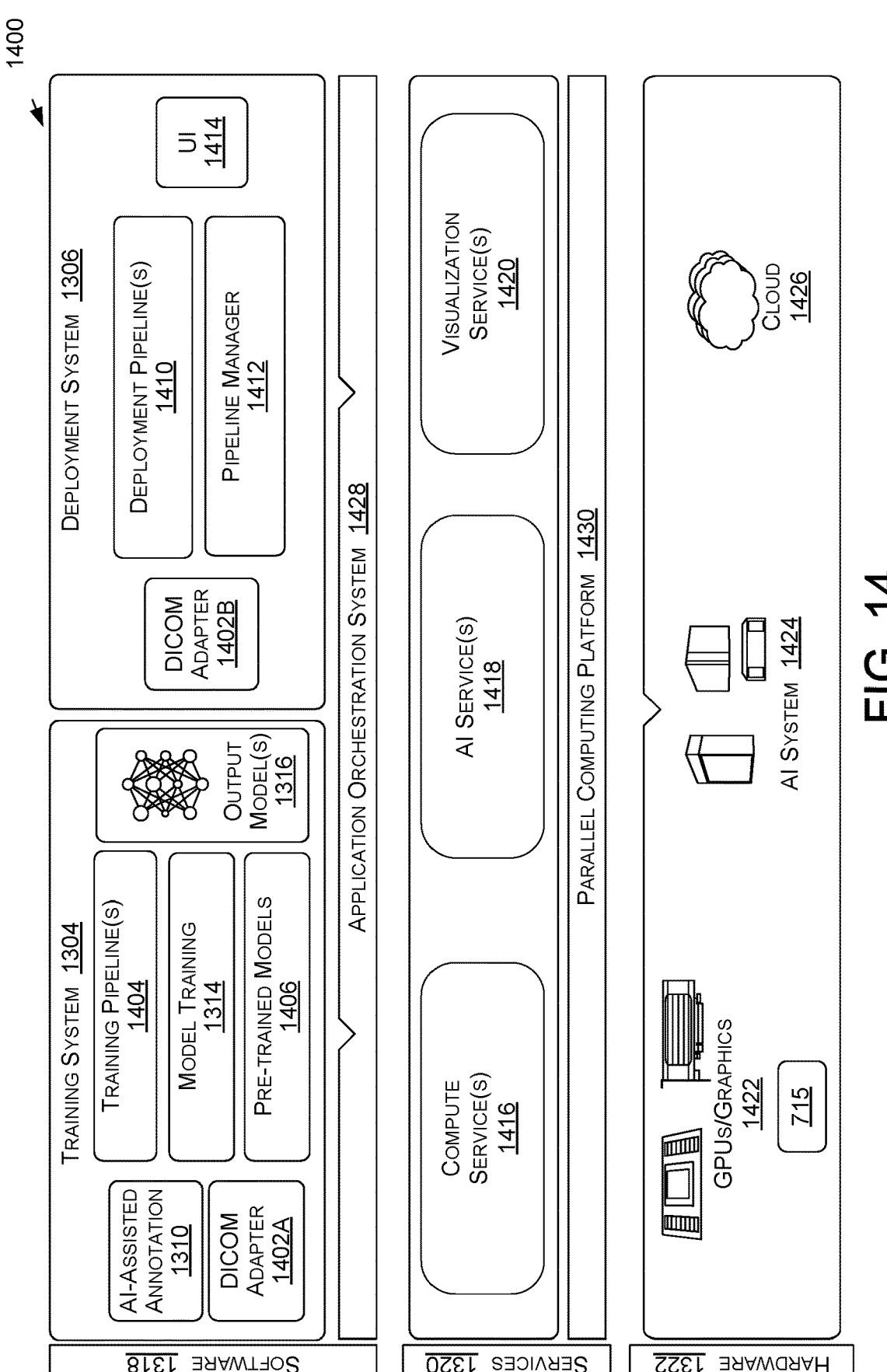
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity-who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning super-computer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
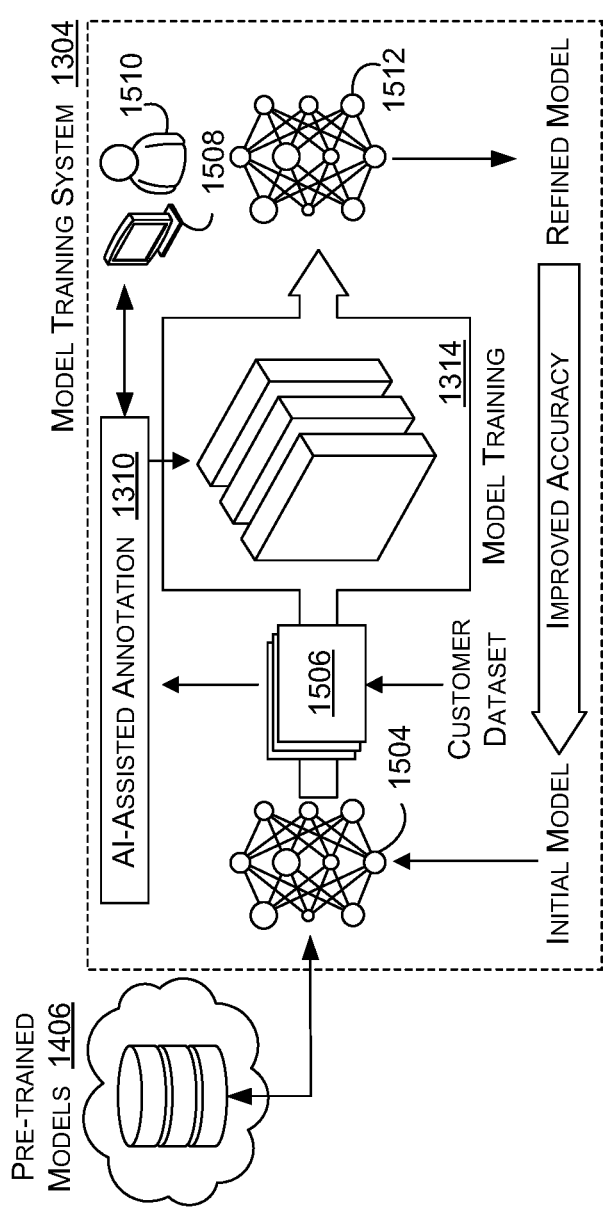
FIGS. 15A and 15B illustrate a data flow diagram for a process to train a machine learning model, as well as client-server architecture to enhance annotation tools with pre-trained annotation models, in accordance with at least one embodiment.
Figure 15B:
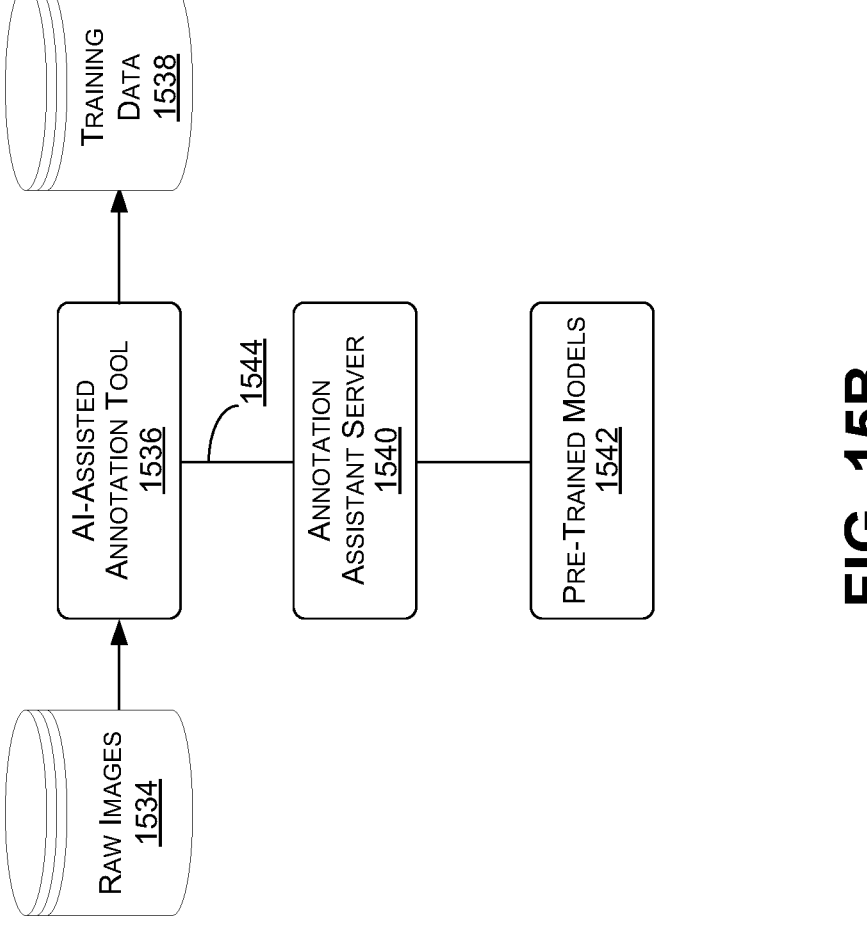

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to composite constituent images into a single representation using parameters determined from one or more quality assessment values.

Automated Technology

Figure 16A:
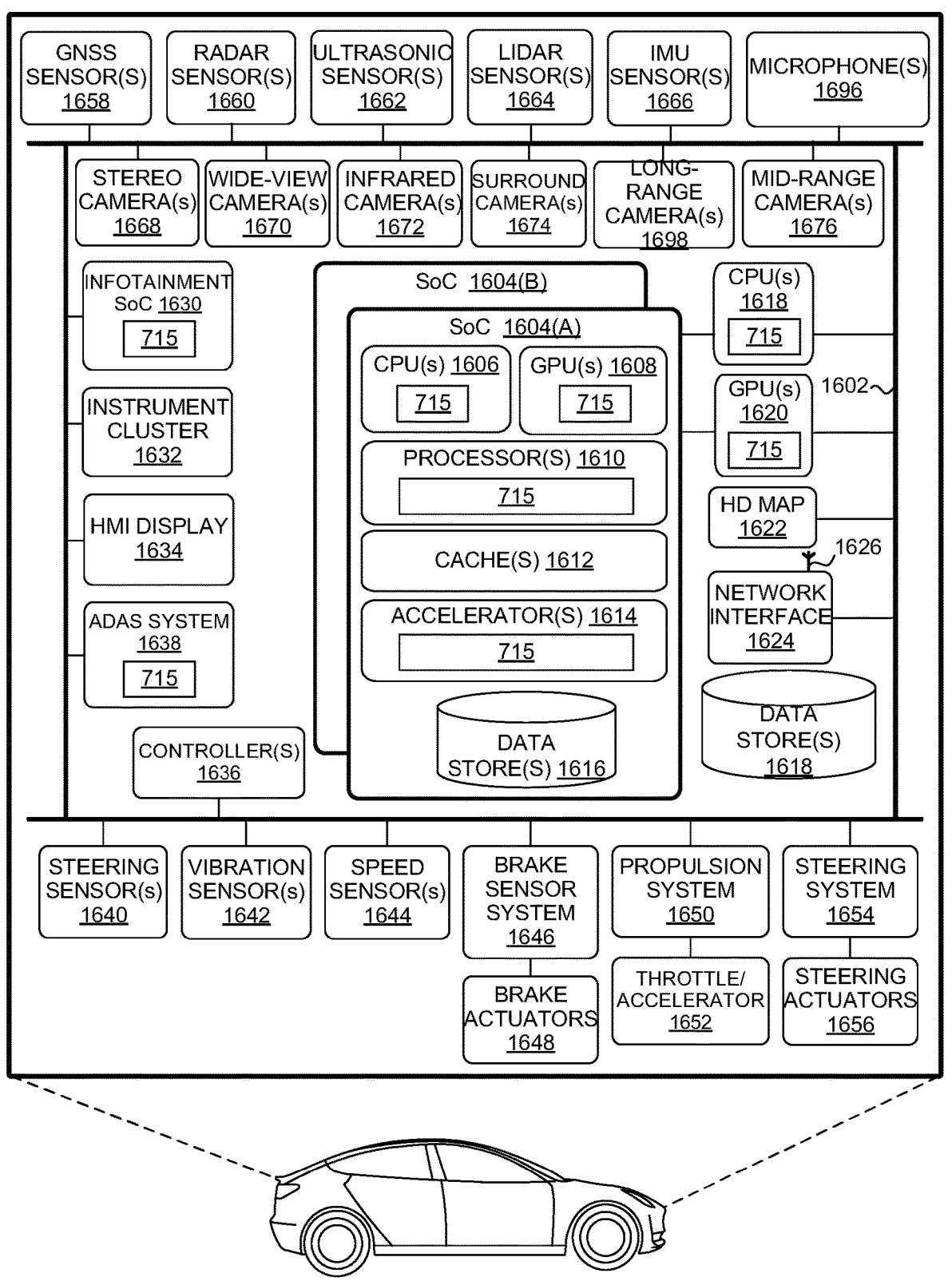
FIGS. 16A and 16B illustrate components that can be used with a vehicle system, in accordance with at least one embodiment.

FIG. 16A is a block diagram illustrating an example system architecture for autonomous vehicle 1600 of FIG. 16A, according to at least one embodiment. In at least one embodiment, each of components, features, and systems of vehicle 1600 in FIG. 16A are illustrated as being connected via a bus 1602. In at least one embodiment, bus 1602 may include, without limitation, a CAN data interface (alternatively referred to herein as a "CAN bus"). In at least one embodiment, a CAN bus may be a network inside vehicle 1600 used to aid in control of various features and functionality of vehicle 1600, such as actuation of brakes, acceleration, braking, steering, windshield wipers, etc. In at least one embodiment, bus 1602 may be configured to have dozens or even hundreds of nodes, each with its own unique identifier (e.g., a CAN ID). In at least one embodiment, bus 1602 may be read to find steering wheel angle, ground speed, engine revolutions per minute ("RPMs"), button positions, and/or other vehicle status indicators. In at least one embodiment, bus 1602 may be a CAN bus that is ASIL B compliant.

In at least one embodiment, in addition to, or alternatively from CAN, FlexRay and/or Ethernet may be used. In at least one embodiment, there may be any number of busses 1602, which may include, without limitation, zero or more CAN busses, zero or more FlexRay busses, zero or more Ethernet busses, and/or zero or more other types of busses using a different protocol. In at least one embodiment, two or more busses 1602 may be used to perform different functions, and/or may be used for redundancy. For example, a first bus 1602 may be used for collision avoidance functionality and a second bus 1602 may be used for actuation control. In at least one embodiment, each bus 1602 may communicate with any of components of vehicle 1600, and two or more busses 1602 may communicate with same components. In at least one embodiment, each of any number of system(s) on chip(s) ("SoC(s)") 1604, each of controller(s) 1636, and/or each computer within vehicle may have access to same input data (e.g., inputs from sensors of vehicle 1600), and may be connected to a common bus, such CAN bus.

In at least one embodiment, vehicle 1600 may include one or more controller(s) 1636, such as those described herein with respect to FIG. 1A. Controller(s) 1636 may be used for a variety of functions. In at least one embodiment, controller(s) 1636 may be coupled to any of various other components and systems of vehicle 1600, and may be used for control of vehicle 1600, artificial intelligence of vehicle 1600, infotainment for vehicle 1600, and/or like.

In at least one embodiment, vehicle 1600 may include any number of SoCs 1604. Each of SoCs 1604 may include, without limitation, central processing units ("CPU(s)") 1606, graphics processing units ("GPU(s)") 1608, processor(s) 1610, cache(s) 1612, accelerator(s) 1614, data store(s) 1616, and/or other components and features not illustrated. In at least one embodiment, SoC(s) 1604 may be used to control vehicle 1600 in a variety of platforms and systems. For example, in at least one embodiment, SoC(s) 1604 may be combined in a system (e.g., system of vehicle 1600) with a High Definition ("HD") map 1622 which may obtain map refreshes and/or updates via network interface 1624 from one or more servers (not shown in FIG. 16A).

In at least one embodiment, CPU(s) 1606 may include a CPU cluster or CPU complex (alternatively referred to herein as a "CCPLEX"). In at least one embodiment, CPU(s) 1606 may include multiple cores and/or level two ("L2") caches. For instance, in at least one embodiment, CPU(s) 1606 may include eight cores in a coherent multi-processor configuration. In at least one embodiment, CPU(s) 1606 may include four dual-core clusters where each cluster has a dedicated L2 cache (e.g., a 2 MB L2 cache). In at least one embodiment, CPU(s) 1606 (e.g., CCPLEX) may be configured to support simultaneous cluster operation enabling any combination of clusters of CPU(s) 1606 to be active at any given time.

In at least one embodiment, one or more of CPU(s) 1606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1608 may include an integrated GPU (alternatively referred to herein as an "iGPU"). In at least one embodiment, GPU(s) 1608 may be programmable and may be efficient for parallel workloads. In at least one embodiment, GPU(s) 1608, in at least one embodiment, may use an enhanced tensor instruction set. In at least one embodiment, GPU(s) 1608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1608 may include at least eight streaming microprocessors. In at least one embodiment, GPU(s) 1608 may use compute application programming interface(s) (API(s)). In at least one embodiment, GPU(s) 1608 may use one or more parallel computing platforms and/or programming models (e.g., NVIDIA's CUDA).

In at least one embodiment, one or more of GPU(s) 1608 may be power-optimized for best performance in automotive and embedded use cases. For example, in on embodiment, GPU(s) 1608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1608 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1608 may include unified memory technology. In at least one embodiment, address translation services ("ATS") support may be used to allow GPU(s) 1608 to access CPU(s) 1606 page tables directly. In at least one embodiment, embodiment, when GPU(s) 1608 memory management unit ("MMU") experiences a miss, an address translation request may be transmitted to CPU(s) 1606. In response, CPU(s) 1606 may look in its page tables for virtual-to-physical mapping for address and transmits translation back to GPU(s) 1608, in at least one embodiment. In at least one embodiment, unified memory technology may allow a single unified virtual address space for memory of both CPU(s) 1606 and GPU(s) 1608, thereby simplifying GPU(s) 1608 programming and porting of applications to GPU(s) 1608.

In at least one embodiment, GPU(s) 1608 may include any number of access counters that may keep track of frequency of access of GPU(s) 1608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1604 may include any number of cache(s) 1612, including those described herein. For example, in at least one embodiment, cache(s) 1612 could include a level three ("L3") cache that is available to both CPU(s) 1606 and GPU(s) 1608 (e.g., that is connected both CPU(s) 1606 and GPU(s) 1608). In at least one embodiment, cache(s) 1612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1604 may include one or more accelerator(s) 1614 (e.g., hardware accelerators, software accelerators, or a combination thereof). In at least one embodiment, SoC(s) 1604 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1608 and to off-load some of tasks of GPU(s) 1608 (e.g., to free up more cycles of GPU(s) 1608 for performing other tasks). In at least one embodiment, accelerator(s) 1614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1614 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1696; a CNN for facial recognition and vehicle owner identification using data from camera sensors; and/or a CNN for security and/or safety related events.

In at least one embodiment, DLA(s) may perform any function of GPU(s) 1608, and by using an inference accelerator, for example, a designer may target either DLA(s) or GPU(s) 1608 for any function. For example, in at least one embodiment, designer may focus processing of CNNs and floating point operations on DLA(s) and leave other functions to GPU(s) 1608 and/or other accelerator(s) 1614.

In at least one embodiment, accelerator(s) 1614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1606. In at least one embodiment, DMA may support any number of features used to provide optimization to PVA including, but not limited to, supporting multidimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1614 (e.g., hardware acceleration cluster) may include a computer vision network on-chip and static random-access memory ("SRAM"), for providing a high-bandwidth, low latency SRAM for accelerator(s) 1614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1614 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1666 that correlates with vehicle 1600 orientation, distance, 3D location estimates of object obtained from neural network and/or other sensors (e.g., LIDAR sensor(s) 1664 or RADAR sensor(s) 1660), among others.

In at least one embodiment, one or more of SoC(s) 1604 may include data store(s) 1616 (e.g., memory). In at least one embodiment, data store(s) 1616 may be on-chip memory of SoC(s) 1604, which may store neural networks to be executed on GPU(s) 1608 and/or DLA. In at least one embodiment, data store(s) 1616 may be large enough in capacity to store multiple instances of neural networks for redundancy and safety. In at least one embodiment, data store(s) 1616 may comprise L2 or L3 cache(s).

In at least one embodiment, one or more of SoC(s) 1604 may include any number of processor(s) 1610 (e.g., embedded processors). In at least one embodiment, processor(s) 1610 may include a boot and power management processor that may be a dedicated processor and subsystem to handle boot power and management functions and related security enforcement. In at least one embodiment, boot and power management processor may be a part of SoC(s) 1604 boot sequence and may provide runtime power management services. In at least one embodiment, boot power and management processor may provide clock and voltage programming, assistance in system low power state transitions, management of SoC(s) 1604 thermals and temperature sensors, and/or management of SoC(s) 1604 power states. In at least one embodiment, each temperature sensor may be implemented as a ring-oscillator whose output frequency is proportional to temperature, and SoC(s) 1604 may use ring-oscillators to detect temperatures of CPU(s) 1606, GPU(s) 1608, and/or accelerator(s) 1614. In at least one embodiment, if temperatures are determined to exceed a threshold, then boot and power management processor may enter a temperature fault routine and put SoC(s) 1604 into a lower power state and/or put vehicle 1600 into a chauffeur to safe stop mode (e.g., bring vehicle 1600 to a safe stop).

In at least one embodiment, processor(s) 1610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1610 may further include a real-time camera engine that may include, without limitation, a dedicated processor subsystem for handling real-time camera management. In at least one embodiment, processor(s) 1610 may further include a high-dynamic range signal processor that may include, without limitation, an image signal processor that is a hardware engine that is part of camera processing pipeline.

In at least one embodiment, processor(s) 1610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1670, surround camera(s) 1674, and/or on in-cabin monitoring camera sensor(s). In at least one embodiment, in-cabin monitoring camera sensor(s) are preferably monitored by a neural network running on another instance of SoC(s) 1604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1608 are not required to continuously render new surfaces. In at least one embodiment, when GPU(s) 1608 are powered on and active doing 3D rendering, video image compositor may be used to offload GPU(s) 1608 to improve performance and responsiveness.

In at least one embodiment, one or more of SoC(s) 1604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1604 may further include an input/output controller(s) that may be controlled by software and may be used for receiving I/O signals that are uncommitted to a specific role.

In at least one embodiment, one or more of SoC(s) 1604 may further include a broad range of peripheral interfaces to enable communication with peripherals, audio encoders/ decoders ("codecs"), power management, and/or other devices. SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus), etc. In at least one embodiment, one or more of SoC(s) 1604 may further include dedicated high-performance mass storage controllers that may include their own DMA engines, and that may be used to free CPU(s) 1606 from routine data management tasks.

In at least one embodiment, SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1604 may be faster, more reliable, and even more energy-efficient and space-efficient than conventional systems. For example, in at least one embodiment, accelerator(s) 1614, when combined with CPU(s) 1606, GPU(s) 1608, and data store(s) 1616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1608.

In at least one embodiment, a CNN for facial recognition and vehicle owner identification may use data from camera sensors to identify presence of an authorized driver and/or owner of vehicle 1600. In at least one embodiment, an always on sensor processing engine may be used to unlock vehicle when owner approaches driver door and turn on lights, and, in security mode, to disable vehicle when owner leaves vehicle. In this way, SoC(s) 1604 provide for security against theft and/or carjacking.

In at least one embodiment, a CNN for emergency vehicle detection and identification may use data from microphones 1696 to detect and identify emergency vehicle sirens. In at least one embodiment, SoC(s) 1604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1662, until emergency vehicle(s) passes.

In at least one embodiment, vehicle 1600 may include CPU(s) 1618 (e.g., discrete CPU(s), or dCPU(s)), that may be coupled to SoC(s) 1604 via a high-speed interconnect (e.g., PCIe). In at least one embodiment, CPU(s) 1618 may include an X86 processor, for example. CPU(s) 1618 may be used to perform any of a variety of functions, including arbitrating potentially inconsistent results between ADAS sensors and SoC(s) 1604, and/or monitoring status and health of controller(s) 1636 and/or an infotainment system on a chip ("infotainment SoC") 1630, for example.

In at least one embodiment, vehicle 1600 may include GPU(s) 1620 (e.g., discrete GPU(s), or dGPU(s)), that may be coupled to SoC(s) 1604 via a high-speed interconnect (e.g., NVIDIA's NVLINK). In at least one embodiment, GPU(s) 1620 may provide additional artificial intelligence functionality, such as by executing redundant and/or different neural networks, and may be used to train and/or update neural networks based at least in part on input (e.g., sensor data) from sensors of vehicle 1600.

In at least one embodiment, vehicle 1600 may further include network interface 1624 which may include, without limitation, wireless antenna(s) 1626 (e.g., one or more wireless antennas 1626 for different communication protocols, such as a cellular antenna, a Bluetooth antenna, etc.). In at least one embodiment, network interface 1624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 160 and other vehicle and/or an indirect link may be established (e.g., across networks and over Internet). In at least one embodiment, direct links may be provided using a vehicle-to-vehicle communication link.

A vehicle-to-vehicle communication link may provide vehicle 1600 information about vehicles in proximity to vehicle 1600 (e.g., vehicles in front of, on side of, and/or behind vehicle 1600). In at least one embodiment, aforementioned functionality may be part of a cooperative adaptive cruise control functionality of vehicle 1600.

In at least one embodiment, network interface 1624 may include an SoC that provides modulation and demodulation functionality and enables controller(s) 1636 to communicate over wireless networks. In at least one embodiment, network interface 1624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 1600 may further include data store(s) 1628 which may include, without limitation, off-chip (e.g., off SoC(s) 1604) storage. In at least one embodiment, data store(s) 1628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1600 may further include GNSS sensor(s) 1658 (e.g., GPS and/or assisted GPS sensors), to assist in mapping, perception, occupancy grid generation, and/or path planning functions. In at least one embodiment, any number of GNSS sensor(s) 1658 may be used, including, for example and without limitation, a GPS using a USB connector with an Ethernet to Serial (e.g., RS-232) bridge.

In at least one embodiment, vehicle 1600 may further include RADAR sensor(s) 1660. RADAR sensor(s) 1660 may be used by vehicle 1600 for long-range vehicle detection, even in darkness and/or severe weather conditions. In at least one embodiment, RADAR functional safety levels may be ASIL B. RADAR sensor(s) 1660 may use CAN and/or bus 1602 (e.g., to transmit data generated by RADAR sensor(s) 1660) for control and to access object tracking data, with access to Ethernet to access raw data in some examples. In at least one embodiment, wide variety of RADAR sensor types may be used. For example, and without limitation, RADAR sensor(s) 1660 may be suitable for front, rear, and side RADAR use. In at least one embodiment, one or more of RADAR sensors(s) 1660 are Pulse Doppler RADAR sensor(s).

In at least one embodiment, RADAR sensor(s) 1660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1660 may help in distinguishing between static and moving objects, and may be used by ADAS system 1638 for emergency brake assist and forward collision warning. Sensors 1660 (s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1600's surroundings at higher speeds with minimal interference from traffic in adjacent lanes. In at least one embodiment, other two antennae may expand field of view, making it possible to quickly detect vehicles entering or leaving vehicle 1600's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1638 for blind spot detection and/or lane change assist.

In at least one embodiment, vehicle 1600 may further include ultrasonic sensor(s) 1662. Ultrasonic sensor(s) 1662, which may be positioned at front, back, and/or sides of vehicle 1600, may be used for park assist and/or to create and update an occupancy grid. In at least one embodiment, a wide variety of ultrasonic sensor(s) 1662 may be used, and different ultrasonic sensor(s) 1662 may be used for different ranges of detection (e.g., 2.5 m, 4 m). In at least one embodiment, ultrasonic sensor(s) 1662 may operate at functional safety levels of ASIL B.

In at least one embodiment, vehicle 1600 may include LIDAR sensor(s) 1664. LIDAR sensor(s) 1664 may be used for object and pedestrian detection, emergency braking, collision avoidance, and/or other functions. In at least one embodiment, LIDAR sensor(s) 1664 may be functional safety level ASIL B. In at least one embodiment, vehicle 1600 may include multiple LIDAR sensors 1664 (e.g., two, four, six, etc.) that may use Ethernet (e.g., to provide data to a Gigabit Ethernet switch).

In at least one embodiment, LIDAR sensor(s) 1664 may be capable of providing a list of objects and their distances for a 360-degree field of view. In at least one embodiment, commercially available LIDAR sensor(s) 1664 may have an advertised range of approximately 100 m, with an accuracy of 2 cm-3 cm, and with support for a 100 Mbps Ethernet connection, for example. In at least one embodiment, one or more non-protruding LIDAR sensors 1664 may be used. In such an embodiment, LIDAR sensor(s) 1664 may be implemented as a small device that may be embedded into front, rear, sides, and/or corners of vehicle 1600. In at least one embodiment, LIDAR sensor(s) 1664, in such an embodiment, may provide up to a 120-degree horizontal and 35-degree vertical field-of-view, with a 200 m range even for low-reflectivity objects. In at least one embodiment, front-mounted LIDAR sensor(s) 1664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1600 up to approximately 200 m. In at least one embodiment, a flash LIDAR unit includes, without limitation, a receptor, which records laser pulse transit time and reflected light on each pixel, which in turn corresponds to range from vehicle 1600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1666. In at least one embodiment, IMU sensor(s) 1666 may be located at a center of rear axle of vehicle 1600, in at least one embodiment. In at least one embodiment, IMU sensor(s) 1666 may include, for example and without limitation, accelerometer(s), magnetometer(s), gyroscope(s), magnetic compass(es), and/or other sensor types. In at least one embodiment, such as in six-axis applications, IMU sensor(s) 1666 may include, without limitation, accelerometers and gyroscopes. In at least one embodiment, such as in nine-axis applications, IMU sensor(s) 1666 may include, without limitation, accelerometers, gyroscopes, and magnetometers.

In at least one embodiment, IMU sensor(s) 1666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1666 may enable vehicle 1600 to estimate heading without requiring input from a magnetic sensor by directly observing and correlating changes in velocity from GPS to IMU sensor(s) 1666. In at least one embodiment, IMU sensor(s) 1666 and GNSS sensor(s) 1658 may be combined in a single integrated unit.

In at least one embodiment, vehicle 1600 may include microphone(s) 1696 placed in and/or around vehicle 1600. In at least one embodiment, microphone(s) 1696 may be used for emergency vehicle detection and identification, among other things.

In at least one embodiment, vehicle 1600 may further include any number of camera types, including stereo camera(s) 1668, wide-view camera(s) 1670, infrared camera(s) 1672, surround camera(s) 1674, long-range camera(s) 1698, mid-range camera(s) 1676, and/or other camera types. In at least one embodiment, cameras may be used to capture image data around an entire periphery of vehicle 1600. In at least one embodiment, types of cameras used depends on vehicle 1600. In at least one embodiment, any combination of camera types may be used to provide necessary coverage around vehicle 1600. In at least one embodiment, number of cameras may differ depending on embodiment. For example, in at least one embodiment, vehicle 1600 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 16A and FIG. 16B.

In at least one embodiment, vehicle 1600 may further include vibration sensor(s) 1642. In at least one embodiment, vibration sensor(s) 1642 may measure vibrations of components of vehicle 1600, such as axle(s). For example, in at least one embodiment, changes in vibrations may indicate a change in road surfaces. In at least one embodiment, when two or more vibration sensors 1642 are used, differences between vibrations may be used to determine friction or slippage of road surface (e.g., when difference in vibration is between a power-driven axle and a freely rotating axle).

In at least one embodiment, vehicle 1600 may include ADAS system 1638. ADAS system 1638 may include, without limitation, an SoC, in some examples. In at least one embodiment, ADAS system 1638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1660, LIDAR sensor(s) 1664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1600 and automatically adjust speed of vehicle 1600 to maintain a safe distance from vehicles ahead. In at least one embodiment, lateral ACC system performs distance keeping, and advises vehicle 1600 to change lanes when necessary. In at least one embodiment, lateral ACC is related to other ADAS applications such as LC and CW.

In at least one embodiment, CACC system uses information from other vehicles that may be received via network interface 1624 and/or wireless antenna(s) 1626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1600), while I2V communication concept provides information about traffic further ahead. In at least one embodiment, CACC system may include either or both I2V and V2V information sources. In at least one embodiment, given information of vehicles ahead of vehicle 1600, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1600 if vehicle 1600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1600 is backing up. In at least one embodiment, RCTW system includes AEB system to ensure that vehicle brakes are applied to avoid a crash. In at least one embodiment, RCTW system may use one or more rear-facing RADAR sensor(s) 1660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1600 itself decides, in case of conflicting results, whether to heed result from a primary computer or a secondary computer (e.g., first controller 1636 or second controller 1636). For example, in at least one embodiment, ADAS system 1638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1604.

In at least one embodiment, ADAS system 1638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1638 may be fed into primary computer's perception block and/or primary computer's dynamic driving task block. For example, in at least one embodiment, if ADAS system 1638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1600 may further include infotainment SoC 1630 (e.g., an in-vehicle infotainment system (IVI)). Although illustrated and described as an SoC, infotainment system 1630, in at least one embodiment, may not be an SoC, and may include, without limitation, two or more discrete components. In at least one embodiment, infotainment SoC 1630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1600. For example, infotainment SoC 1630 could include radios, disk players, navigation systems, video players, USB and Bluetooth connectivity, carputers, in-car entertainment, WiFi, steering wheel audio controls, hands free voice control, a heads-up display ("HUD"), HMI display 1634, a telematics device, a control panel (e.g., for controlling and/or interacting with various components, features, and/or systems), and/or other components. In at least one embodiment, infotainment SoC 1630 may further be used to provide information (e.g., visual and/or audible) to user(s) of vehicle, such as information from ADAS system 1638, autonomous driving information such as planned vehicle maneuvers, trajectories, surrounding environment information (e.g., intersection information, vehicle information, road information, etc.), and/or other information.

In at least one embodiment, infotainment SoC 1630 may include any amount and type of GPU functionality. In at least one embodiment, infotainment SoC 1630 may communicate over bus 1602 (e.g., CAN bus, Ethernet, etc.) with other devices, systems, and/or components of vehicle 1600. In at least one embodiment, infotainment SoC 1630 may be coupled to a supervisory MCU such that GPU of infotainment system may perform some self-driving functions in event that primary controller(s) 1636 (e.g., primary and/or backup computers of vehicle 1600) fail. In at least one embodiment, infotainment SoC 1630 may put vehicle 1600 into a chauffeur to safe stop mode, as described herein.

In at least one embodiment, vehicle 1600 may further include instrument cluster 1632 (e.g., a digital dash, an electronic instrument cluster, a digital instrument panel, etc.). In at least one embodiment, instrument cluster 1632 may include, without limitation, a controller and/or supercomputer (e.g., a discrete controller or supercomputer). In at least one embodiment, instrument cluster 1632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1630 and instrument cluster 1632. In at least one embodiment, instrument cluster 1632 may be included as part of infotainment SoC 1630, or vice versa.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 16A for inferencing or predicting operations based, at least in part, on weight parameters calculated using neural network training operations, neural network functions and/or architectures, or neural network use cases described herein.

Figure 16B:
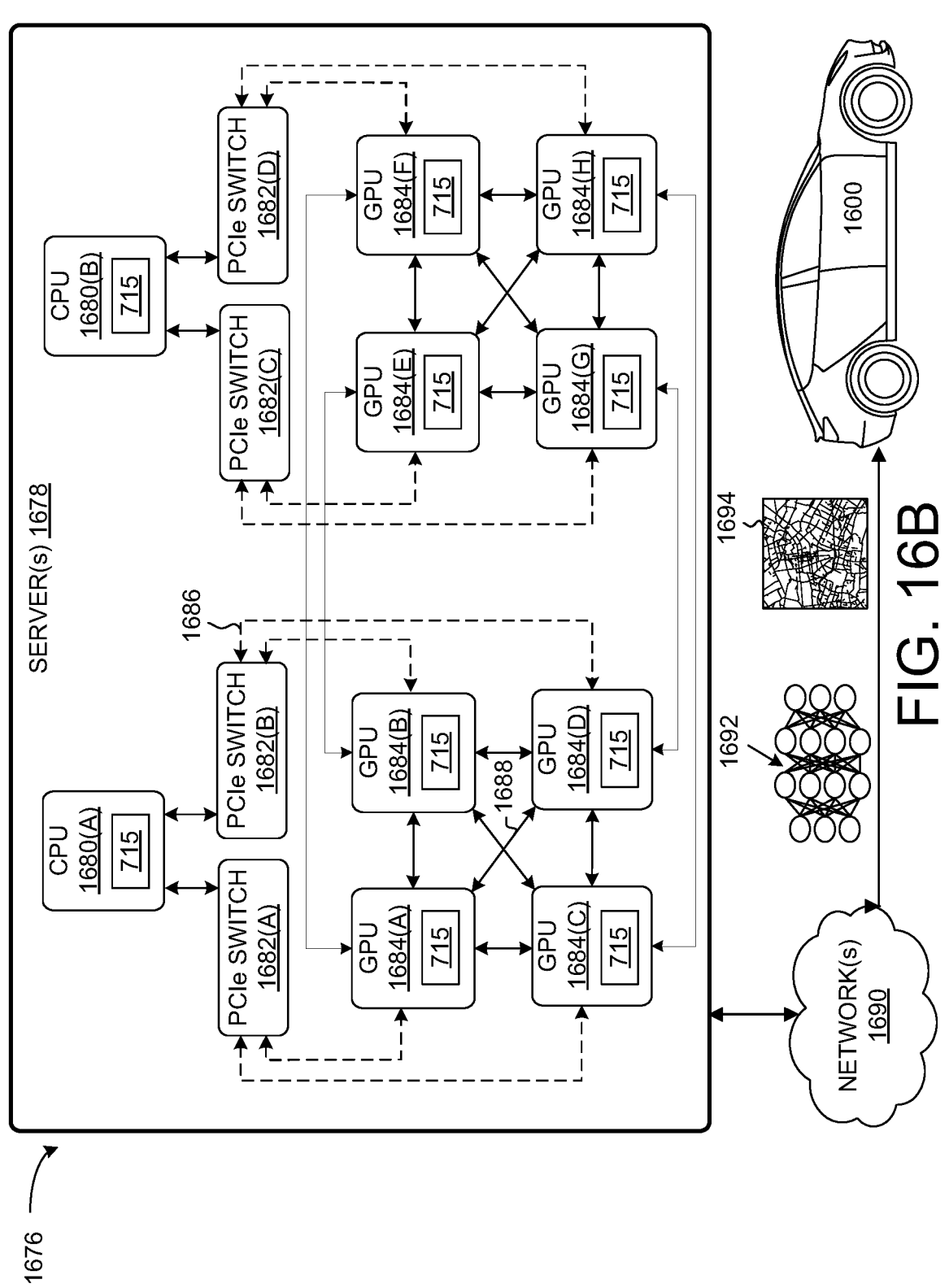

FIG. 16B is a diagram of a system 1676 for communication between cloud-based server(s) and autonomous vehicle 1600 of FIG. 16A, according to at least one embodiment. In at least one embodiment, system 1676 may include, without limitation, server(s) 1678, network(s) 1690, and any number and type of vehicles, including vehicle 1600. In at least one embodiment, server(s) 1678 may include, without limitation, a plurality of GPUs 1684(A)-1684(H) (collectively referred to herein as GPUs 1684), PCIe switches 1682(A)-1682(D) (collectively referred to herein as PCIe switches 1682), and/or CPUs 1680(A)-1680(B) (collectively referred to herein as CPUs 1680). GPUs 1684, CPUs 1680, and PCIe switches 1682 may be interconnected with high-speed interconnects such as, for example and without limitation, NVLink interfaces 1688 developed by NVIDIA and/or PCIe connections 1686. In at least one embodiment, GPUs 1684 are connected via an NVLink and/or NVSwitch SoC and GPUs 1684 and PCIe switches 1682 are connected via PCIe interconnects. In at least one embodiment, although eight GPUs 1684, two CPUs 1680, and four PCIe switches 1682 are illustrated, this is not intended to be limiting. In at least one embodiment, each of server(s) 1678 may include, without limitation, any number of GPUs 1684, CPUs 1680, and/or PCIe switches 1682, in any combination. For example, in at least one embodiment, server(s) 1678 could each include eight, sixteen, thirty-two, and/or more GPUs 1684.

In at least one embodiment, server(s) 1678 may receive, over network(s) 1690 and from vehicles, image data representative of images showing unexpected or changed road conditions, such as recently commenced road-work. In at least one embodiment, server(s) 1678 may transmit, over network(s) 1690 and to vehicles, neural networks 1692, updated neural networks 1692, and/or map information 1694, including, without limitation, information regarding traffic and road conditions. In at least one embodiment, updates to map information 1694 may include, without limitation, updates for HD map 1622, such as information regarding construction sites, potholes, detours, flooding, and/or other obstructions. In at least one embodiment, neural networks 1692, updated neural networks 1692, and/or map information 1694 may have resulted from new training and/or experiences represented in data received from any number of vehicles in environment, and/or based at least in part on training performed at a data center (e.g., using server(s) 1678 and/or other servers).

In at least one embodiment, server(s) 1678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other preprocessing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1690, and/or machine learning models may be used by server(s) 1678 to remotely monitor vehicles.

In at least one embodiment, server(s) 1678 may receive data from vehicles and apply data to up-to-date real-time neural networks for real-time intelligent inferencing. In at least one embodiment, server(s) 1678 may include deep-learning supercomputers and/or dedicated AI computers powered by GPU(s) 1684, such as a DGX and DGX Station machines developed by NVIDIA. However, in at least one embodiment, server(s) 1678 may include deep learning infrastructure that use CPU-powered data centers.

In at least one embodiment, deep-learning infrastructure of server(s) 1678 may be capable of fast, real-time inferencing, and may use that capability to evaluate and verify health of processors, software, and/or associated hardware in vehicle 1600. For example, in at least one embodiment, deep-learning infrastructure may receive periodic updates from vehicle 1600, such as a sequence of images and/or objects that vehicle 1600 has located in that sequence of images (e.g., via computer vision and/or other machine learning object classification techniques). In at least one embodiment, deep-learning infrastructure may run its own neural network to identify objects and compare them with objects identified by vehicle 1600 and, if results do not match and deep-learning infrastructure concludes that AI in vehicle 1600 is malfunctioning, then server(s) 1678 may transmit a signal to vehicle 1600 instructing a fail-safe computer of vehicle 1600 to assume control, notify passengers, and complete a safe parking maneuver.

In at least one embodiment, server(s) 1678 may include GPU(s) 1684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 715 are used to perform one or more embodiments. Details regarding inference and/or training logic 715 are provided below in conjunction with FIGS. 7A and/or 7B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more processing units to:
   determine a tolerable latency for a sensor of a plurality of sensors associated with local hardware of an autonomous or semi-autonomous vehicle;
   determine a current sensor perception latency for the sensor is greater than the tolerable latency;
   select a work prioritization process flow for the sensor, responsive to the determination;
   identify, from the plurality of sensors, one or more low priority sensors associated with one or more feeds having a lower priority than a feed of the sensor; and
   cause local processing resources to be diverted from the one or more low priority sensors to the sensor.

2. The processor of claim 1, wherein the one or more processing units are further to:
   select an alarm process flow, wherein the alarm process flow includes generating an alarm.

3. The processor of claim 1, wherein upon selection of the work prioritization process flow, the one or more processing units are further to:
   cause a pre-processing rate drop for data transmitted to the sensor; and
   determine an updated sensor latency for the sensor.

4. The processor of claim 1, wherein the one or more processing units are further to:
   determine a desired frame processing rate based, at least in part, on the tolerable latency; and
   compare the desired frame processing rate to a perceived frame processing rate of the sensor.

5. The processor of claim 4, wherein the perceived frame processing rate of the sensor is less than an absolute frame processing rate of the sensor.

6. The processor of claim 1, wherein the one or more processing units are further to:
   detect, based at least in part on sensor data, a plurality of objects;
   determine, for each object, an object latency;
   determine a smallest object latency for the plurality of objects; and
   assign the tolerable latency based, at least in part, on the smallest object latency.

7. A processor, comprising:
one or more processing units to:
  determine a tolerable latency for a sensor of a plurality of sensors associated with hardware resources of an autonomous or semi-autonomous vehicle;
  determine a current sensor perception latency for the sensor is greater than the tolerable latency;
  perform a safety check for the sensor, the safety check selecting, from at least one of an alarm process flow or a work prioritization process flow, the workflow prioritization process flow;
  determine a minimum number of processing resources are unavailable for the sensor; and
  cause the autonomous or semi-autonomous vehicle to operate in a degraded mode disabling functionality of one or more auxiliary systems.

8. The processor of claim 7, wherein the one or more processing units are further to:
  select the alarm process flow, wherein the alarm process flow includes generating an alarm.

9. The processor of claim 7, wherein upon selection of the work prioritization process flow, the one or more processing units are further to:
  cause a pre-processing rate drop for data transmitted to the sensor; and
  determine an updated sensor latency for the sensor.

10. The processor of claim 7, wherein the one or more processing units are further to:
  determine a desired frame processing rate based, at least in part, on the tolerable latency; and
  compare the desired frame processing rate to a perceived frame processing rate of the sensor.

11. The processor of claim 10, wherein the perceived frame processing rate of the sensor is less than an absolute frame processing rate of the sensor.

12. The processor of claim 7, wherein the one or more processing units are further to:
  detect, based at least in part on sensor data, a plurality of objects;
  determine, for each object, an object latency;
  determine a smallest object latency for the plurality of objects; and
  assign the tolerable latency based, at least in part, on the smallest object latency.

13. A processor, comprising:
one or more processing units to:
  determine a tolerable latency for a sensor of a plurality of sensors associated with local hardware of an autonomous or semi-autonomous vehicle;
  determine a current sensor perception latency for the sensor is greater than the tolerable latency;
  perform a safety check for the sensor, the safety check selecting, from at least one of an alarm process flow or a work prioritization process flow, the workflow prioritization process flow; and
  cause the autonomous or semi-autonomous vehicle to launch one or more alternative operational models and end operation of one or more currently executing models.

14. The processor of claim 13, wherein the one or more processing units are further to:
  select the alarm process flow, wherein the alarm process flow includes generating an alarm.

15. The processor of claim 13, wherein upon selection of the work prioritization process flow, the one or more processing units are further to:
  cause a pre-processing rate drop for data transmitted to the sensor; and
  determine an updated sensor latency for the sensor.

16. The processor of claim 13, wherein the one or more processing units are further to:
  determine a desired frame processing rate based, at least in part, on the tolerable latency; and
  compare the desired frame processing rate to a perceived frame processing rate of the sensor.

17. The processor of claim 16, wherein the perceived frame processing rate of the sensor is less than an absolute frame processing rate of the sensor.

18. The processor of claim 13, wherein the one or more processing units are further to:
  detect, based at least in part on sensor data, a plurality of objects;
  determine, for each object, an object latency;
  determine a smallest object latency for the plurality of objects; and
  assign the tolerable latency based, at least in part, on the smallest object latency.

* * * * *